United States Patent
Yu et al.

(10) Patent No.: US 12,212,438 B2
(45) Date of Patent: Jan. 28, 2025

(54) PPDU TRANSMISSION METHOD AND RELATED APPARATUS

(71) Applicant: HUAWEI TECHNOLOGIES CO., LTD., Shenzhen (CN)

(72) Inventors: Jian Yu, Shenzhen (CN); Genadiy Tsodik, Hod Hasharon (IL); Shimon Shilo, Hod Hasharon (IL); Ming Gan, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/074,269

(22) Filed: Dec. 2, 2022

(65) Prior Publication Data
US 2023/0096177 A1    Mar. 30, 2023

Related U.S. Application Data

(63) Continuation of application No. PCT/CN2021/096553, filed on May 27, 2021.

(30) Foreign Application Priority Data

Jun. 5, 2020   (CN) ......................... 202010506948.X

(51) Int. Cl.
*H04L 25/02* (2006.01)
*H04L 5/00* (2006.01)

(52) U.S. Cl.
CPC ........ *H04L 25/0224* (2013.01); *H04L 5/0044* (2013.01)

(58) Field of Classification Search
CPC ........................ H04L 25/0224; H04L 5/0044
See application file for complete search history.

(56) References Cited

U.S. PATENT DOCUMENTS

2019/0116513 A1   4/2019   Verma et al.
2019/0165883 A1*  5/2019   Chun ................... H04W 84/12
(Continued)

FOREIGN PATENT DOCUMENTS

CN   101848063 A    9/2010
CN   106533522 A    3/2017
(Continued)

OTHER PUBLICATIONS

Khorov et al., "Current Status and Directions of IEEE 802.11be, the Future Wi-Fi 7," IEEE Access, vol. 8, pp. 88664-88688 (May 2020).
(Continued)

*Primary Examiner* — Kevin M Cunningham
(74) *Attorney, Agent, or Firm* — Leydig, Voit & Mayer, Ltd.

(57) ABSTRACT

Disclosed are a physical layer (PHY) protocol data unit (PPDU) transmission method and a related apparatus. The method includes: generating a PPDU, where the PPDU includes a universal signal field (U-SIG), and the U-SIG includes a subfield indicating that the PPDU is a null data packet (NDP); and sending the PPDU. In this way, a beamformee (Bfee) that receives the NDP can identify the NDP earlier. This helps improve efficiency of reading the NDP by the Bfee. The PPDU is an NDP used for a standard after 802.11ax. In a scenario in which wireless communication is performed by using the standard (for example, 802.11be) after 802.11ax, the Bfee can perform channel estimation based on the NDP.

6 Claims, 15 Drawing Sheets

| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | Data Data | PE Packet extension |

(56) References Cited

U.S. PATENT DOCUMENTS

| | | | |
|---|---|---|---|
| 2019/0373586 A1* | 12/2019 | Verma | H04W 72/51 |
| 2020/0008185 A1 | 1/2020 | Chen et al. | |
| 2020/0177425 A1* | 6/2020 | Chen | H04L 27/2602 |
| 2021/0045151 A1* | 2/2021 | Chen | H04L 27/2602 |
| 2021/0127291 A1* | 4/2021 | Chen | H04W 28/06 |
| 2021/0250215 A1 | 8/2021 | Lim et al. | |
| 2021/0336752 A1* | 10/2021 | Kwon | H04L 5/0094 |

FOREIGN PATENT DOCUMENTS

| | | |
|---|---|---|
| CN | 106576020 A | 4/2017 |
| CN | 106797294 A | 5/2017 |
| CN | 110708148 A | 1/2020 |
| CN | 110730050 A | 1/2020 |
| KR | 20140109374 A | 9/2014 |
| KR | 20180018549 A | 2/2018 |
| KR | 20220033966 A | 3/2022 |
| KR | 20230041706 A | 3/2023 |
| WO | 2020096895 A1 | 5/2020 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™-2016, Total 3534 pages (Dec. 7, 2016).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax™/D6.0, Total 780 pages (Nov. 2019).

CN/202211212493.6, Office Action and Search Report, Jun. 8, 2023.

Lim et al., "Further discussion for 11be preamble," IEEE 802.11-19/1486r0, XP068153664, Total 18 pages, Institute of Electrical and Electronics Engineers, New York, New York (Sep. 16, 2019).

Lim et al., "11be PPDU format," IEEE 802.11-20/0019, XP068165129, Total 22 Pages, Institute of Electrical and Electronics Engineers, New York, New York (Jan. 13, 2020).

Jian Yu et al., "EHT-SIG Compression Format," XP068168014, IEEE 802.11-20/0783r1, Total 16 pages, Institute of Electrical and Electronics Engineers, New York, New York (May 2020).

Huang et al., "Discussion on EHT PPDU Formats," IEEE Draft, IEEE 802.11-20/0031r2, Panasonic Corporation, Total 11 pages, Institute of Electrical and Electronics Engineers, New York, New York (Jan. 2020).

Lee et al., "SU PPDU SIG Contents Considerations," IEEE Draft, IEEE 802.11-20/0285r1, Total 22 pages, Institute of Electrical and Electronics Engineers, New York, New York (Mar. 2020).

Vermani et al., "PPDU Types and U-SIG Content," doc.: IEEE 802.11-20/0049r2, Total 25 pages (Jan. 2020). [Retrieval Date: Jun. 24, 2021], Internet URL: https://mentor.ieee.org/802.11/dcn/20/11-20-0049-02-00be-ppdu-types-and-u-sig-content.pptx> (document indicating well-known technique).

Lim et al., "11be PPDU format," doc.: IEEE 802.11-20/0019r1, Total 25 pages (Jan. 2020). [Retrieval Date: Jun. 24, 2021], Internet URL: https://mentor.ieee.org/802.11/dcn/20/11-20-0019-01-00be-11be-ppdu-format.pptx> (document indicating well-known technique).

Hu et al., "Preamble Structure and SIG Contents," doc.: IEEE 802.11-20/0029r3, Total 23 pages (Jan. 2020). [Retrieval Date: Jun. 24, 2021], Internet URL: https://mentor.ieee.org/802.11/dcn/20/11-20-0029-03-00be-preamble-structure-and-sig-contents.pptx> (document indicating well-known technique).

Lim et al., "Further discussion for 11be preamble," doc.: IEEE 802.11-19/1486r0, Total 19 pages (Sep. 2019). [Retrieval Date: Sep. 17, 2020], Internet URL: https://mentor.ieee.org/802.11/dcn/19/11-19-1486-00-00be-further-discussion-for-11be-preamble.pptx>.

Yu et al., "EHT-SIG Compression Format," doc.: IEEE 802.11-20/0783r1, Total 17 pages (May 2020). [Retrieval Date: Jun. 24, 2021], Internet URL: https://mentor.ieee.org/802.11/dcn/20/11-20-0783-01-00be-eht-sig-compression-format.pptx>.

* cited by examiner

| SU | Legacy short training field L-STF | Legacy long training field L-LTF | Legacy signal field L-SIG | Repeated legacy signal field Repeated L-SIG (RL-SIG) | High efficient signal field A HE-SIG A | High efficient short training field HE-STF | High efficient long training field HE-LTF | Data Data | Packet extension PE |
|---|---|---|---|---|---|---|---|---|---|
| Number of symbols: | 2 | 2 | 1 | 1 | 2 | 1 | 1~8 | ≥1 | |

FIG. 4A

| SU | Legacy short training field L-STF | Legacy long training field L-LTF | Legacy signal field L-SIG | Repeated legacy signal field Repeated L-SIG (RL-SIG) | High efficient signal field A HE-SIG A | High efficient signal field B HE-SIG B | High efficient short training field HE-STF | High efficient long training field HE-LTF | Data Data | Packet extension PE |
|---|---|---|---|---|---|---|---|---|---|---|
| Number of symbols: | 2 | 2 | 1 | 1 | 2 | ≥1 | 1 | 1~8 | ≥1 | |

FIG. 4B

| Legacy short training field L-STF | Legacy long training field L-LTF | Legacy signal field L-SIG | Repeated legacy signal field Repeated L-SIG (RL-SIG) | High efficient signal field A HE-SIG A | High efficient short training field HE-STF | High efficient long training field HE-LTF | Packet extension PE |

FIG. 4C

| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | Data Data | PE Packet extension |

FIG. 5

| L-STF Legacy short training field | L-LTF Legacy long training field | L-SIG Legacy signal field | RL-SIG Repeated legacy signal field | HE-SIG A High efficient signal field A | HE-SIG B High efficient signal field B | HE-STF High efficient short training field | HE-LTF High efficient long training field | Data Data | PE Packet extension |
|---|---|---|---|---|---|---|---|---|---|
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | Data Data | PE Packet extension |
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | Data Data | PE Packet extension |
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | Data Data | PE Packet extension |

FIG. 7

| L-STF Legacy short training field | L-LTF Legacy long training field | L-SIG Legacy signal field | RL-SIG Repeated legacy signal field | HE-SIG A High efficient signal field A | HE-STF High efficient short training field | HE-LTF High efficient long training field | PE Packet extension | | |
|---|---|---|---|---|---|---|---|---|---|
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | PE Packet extension |
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | PE Packet extension |
| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | PE Packet extension |

FIG. 8

| L-STF Legacy short training field | L-LTF Legacy long training field | L-SIG Legacy signal field | RL-SIG Repeated legacy signal field | U-SIG Universal signal field | EHT-STF EHT short training field | EHT-LTF EHT long training field | PE Packet extension |

FIG. 9

| L-STF Legacy short training field | L-LTF Legacy long training field | L-SIG Legacy signal field | RL-SIG Repeated legacy signal field | HE-SIG A High efficient signal field A | HE-STF High efficient short training field | HE-LTF High efficient long training field | PE Packet extension |
|---|---|---|---|---|---|---|---|
| L-STF Legacy short training field | L-LTF Legacy long training field | L-SIG Legacy signal field | RL-SIG Repeated legacy signal field | U-SIG Universal signal field | EHT-STF EHT short training field | EHT-LTF EHT long training field | PE Packet extension |
| L-STF Legacy short training field | L-LTF Legacy long training field | L-SIG Legacy signal field | RL-SIG Repeated legacy signal field | U-SIG Universal signal field | EHT-STF EHT short training field | EHT-LTF EHT long training field | PE Packet extension |
| L-STF Legacy short training field | L-LTF Legacy long training field | L-SIG Legacy signal field | RL-SIG Repeated legacy signal field | U-SIG Universal signal field | EHT-STF EHT short training field | EHT-LTF EHT long training field | PE Packet extension |

FIG. 10

| L-STF Legacy short training field | L-LTF Legacy long training field | L-SIG Legacy signal field | RL-SIG Repeated legacy signal field | U-SIG Universal signal field | EHT-SIG EHT signal field | EHT-STF EHT short training field | EHT-LTF EHT long training field | PE Packet extension |
|---|---|---|---|---|---|---|---|---|

FIG. 11

PPDU TRANSMISSION METHOD AND RELATED APPARATUS

CROSS-REFERENCE TO RELATED APPLICATIONS

This application is a continuation of International Application No. PCT/CN2021/096553, filed on May 27, 2021, which claims priority to Chinese Patent Application No. 202010506948.X, filed on Jun. 5, 2020. The disclosures of the aforementioned applications are hereby incorporated by reference in their entireties.

TECHNICAL FIELD

This application relates to the field of wireless local area network technologies, and in particular, to a PPDU transmission method and a related apparatus.

BACKGROUND

In a wireless system such as a wireless local area network (WLAN), an access point (AP) and a station (STA) need to obtain channel state information in advance to implement functions such as beamforming (BF), rate control, and resource allocation. In the WLAN, a procedure of obtaining the channel state information is referred to as channel sounding. In a related technology, in a process in which an AP performs channel sounding, the AP first sends a null data packet announcement (NDPA) frame to notify a STA that needs to perform channel sounding. Then, after a short interframe space (SIFS), the AP sends a null data packet (NDP) without a data field. The STA performs channel estimation by using the NDP, and then feeds back channel state information (CSI) by using a beamforming report (BF Report) frame. The AP then sends a physical layer (PHY) protocol data unit (PPDU) based on the channel state information fed back by the STA.

A PPDU in the 802.11ax standard is referred to as a high efficient (HE) PPDU, and a PPDU in the 802.11be standard is referred to as an extremely high throughput (EHT) PPDU.

However, in the related technology, only a structure of an HE NDP for an HE PPDU is provided, and no structure of an EHT NDP is designed.

SUMMARY

Implementations of this application provide a PPDU transmission method and a related apparatus, so that in a scenario in which a standard (for example, 802.11be) after 802.11ax is used for wireless communication, an AP or a STA can perform channel estimation by using an NDP to obtain channel state information.

According to a first aspect, this application provides a PPDU transmission method, including: generating a physical layer protocol data unit PPDU, where the PPDU includes a universal signal field U-SIG, and the U-SIG includes a subfield indicating that the PPDU is a null data packet NDP; and sending the PPDU.

The PPDU is an NDP used for a standard after 802.11ax, and does not include a data field. The NDP is used by a Bfee to perform channel estimation.

A device that sends the NDP may be understood as a beamformer (Bfer). A device that receives the NDP, and performs channel estimation based on the NDP may be understood as a beamformee (Bfee). The Bfer may be an AP or a STA. The Bfee may be a STA or an AP.

In an implementation of this application, the U-SIG of the PPDU includes the subfield indicating that the PPDU is the NDP, and the device that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve NDP receiving efficiency.

Optionally, the subfield indicating that the PPDU is the NDP is an NDP indication subfield, a PPDU format subfield, or a subfield indicating a number of EHT-SIG symbols, in the U-SIG.

In some implementations, the PPDU further includes an extremely high throughput-short training field EHT-STF adjacent to and following the U-SIG. The EHT-STF closely follows the U-SIG. The NDP does not include an EHT-SIG. In this way, a structure of the NDP provided in this application is used for an EHT NDP. This helps implement, in an aggregated PPDU transmission scenario, when hybrid transmission is performed on the EHT NDP and an HE NDP, alignment between symbols of the NDPs transmitted on all channels, so that out-of-band interference between different frequency bands can be avoided.

The NDP does not include the EHT-SIG. The U-SIG may not indicate the number of EHT-SIG symbols or a modulation and coding scheme (MCS), and does not need to indicate a coding-related indication, for example, a low density parity check (LDPC) extra symbol segment indication. A packet extension indication may use a fixed value, and therefore does not need to be indicated.

In this way, the U-SIG may not include the subfield indicating the number of EHT-SIG symbols, an MCS subfield, an LDPC extra symbol segment subfield, or a packet extension disambiguity subfield. Bits that are used to carry these fields in a U-SIG of a PPDU including a data field may be used to carry other information in the U-SIG of the NDP; or bits that are used to carry these fields may be used to carry other fields. For example, the bits that are used to carry these fields may be used to carry a subfield indicating a number of EHT-LTF symbols, so that the U-SIG of the NDP can include more information.

It should be understood that, in some optional implementations, based on a structure of an NDP shown in FIG. 9, the U-SIG may alternatively include the subfield indicating the number of EHT-SIG symbols. The subfield indicating the number of EHT-SIG symbols indicates that the number of EHT-SIG symbols is a specified value, and to indicate that the PPDU is the NDP. The subfield indicating the number of EHT-SIG symbols may be, but is not limited to, a subfield indicating a number of EHT-SIG symbols or MU-MIMO users (a subfield indicating a number of EHT-SIG symbols/MU-MIMO users), or a number of EHT-SIG symbols subfield that is used to indicate only the number of EHT-SIG symbols.

Optionally, the U-SIG further includes a number of spatial streams subfield and/or a subfield indicating a number of extremely high throughput-long training field (EHT-LTF) symbols, and the number of spatial streams subfield and/or the subfield indicating the number of EHT-LTF symbols indicate/indicates a number of spatial streams and the number of EHT-LTF symbols. The subfield indicating the number of EHT-LTF symbols may be, for example, a number of EHT-LTF symbols, midamble periodicity and doppler subfield; or may be a number of EHT-LTF symbols subfield that individually indicates the number of EHT-LTF symbols.

According to a second aspect, an implementation of this application further provides a PPDU transmission method, including:

generating a PPDU, where the PPDU is an NDP, the PPDU includes an extremely high throughput-signal field EHT-SIG, a number of EHT-SIG symbols is 1, and the EHT-SIG is modulated by using binary phase shift keying (BPSK) and a code rate of 1/2; and sending the PPDU.

The PPDU is an NDP used for a standard after 802.11ax, and does not include a data field. The NDP is used by a Bfee to perform channel sounding.

In the technical solutions of this application, the number of EHT-SIG symbols of the NDP is 1. A structure of the NDP can reduce the number of EHT-SIG symbols, so that overheads required for transmitting the NDP can be reduced.

In some implementations, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1. The subfield indicating the number of EHT-SIG symbols may be, but is not limited to, a subfield indicating a number of EHT-SIG symbols or MU-MIMO users, or a number of EHT-SIG symbols subfield that is used to indicate only the number of EHT-SIG symbols.

The subfield indicating the number of EHT-SIG symbols indicates that the number of EHT-SIG symbols is 1, and the Bfee that receives the NDP can calculate that a length of the data field in the PPDU is 0, to determine that the PPDU is the NDP. The subfield indicating the number of EHT-SIG symbols indicates that the number of EHT-SIG symbols is greater than 1, and the Bfee can calculate that the length of the data field in the PPDU is less than 0, to determine that the PPDU is the NDP.

In some implementations, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2.

In this way, the Bfee can identify, without calculating a number of symbols of the data field, that the PPDU is the NDP. In this way, the Bfee can prepare in advance a procedure of calculating channel state information, to obtain longer processing time, and does not need to determine, after calculating that a length of a data part of the PPDU is 0, that the PPDU is the NDP. The NDP helps improve efficiency of reading the NDP by the Bfee.

In some implementations, an NDP indication subfield or a PPDU format subfield in the U-SIG indicates that the PPDU is in an uncompressed mode. When the PPDU is in the uncompressed mode, the subfield indicating the number of EHT-SIG symbols or MU-MIMO users in the U-SIG indicates the number of EHT-SIG symbols. In this way, the subfield indicating the number of EHT-SIG symbols or MU-MIMO users can indicate that the number of EHT-SIG symbols is 1.

In some implementations, a number of space-time streams subfield and/or a subfield indicating a number of EHT-LTF symbols in the EHT-SIG indicate/indicates a number of space-time streams and the number of EHT-LTF symbols. The subfield indicating the number of EHT-LTF symbols may be, for example, a number of EHT-LTF symbols, midamble periodicity and doppler subfield; or may be a number of EHT-LTF symbols subfield that individually indicates the number of EHT-LTF symbols.

According to a third aspect, this application further provides a PPDU transmission method, including: generating a PPDU, where the PPDU is an NDP, the PPDU includes an EHT-SIG, the EHT-SIG includes an AID subfield indicating an association identifier AID, and the AID is used to indicate information related to a user of the NDP; and sending the PPDU.

In this way, a Bfee can determine, based on the AID in the EHT-SIG of the NDP, the information related to the user of the NDP. In this way, the Bfee can accurately determine whether the Bfee is a user that needs to perform channel sounding and feed back a beamforming report.

The PPDU in this solution is an NDP used for a standard after 802.11ax, and does not include a data field. The NDP is used by the Bfee to perform channel sounding.

In some implementations, if the user of the NDP is one station, the AID indicated by the AID subfield is an AID of the station. In this way, the station corresponding to the AID can determine, based on the AID in the NDP, that the station is a station that needs to perform channel sounding and feed back a beamforming report based on a channel sounding result.

In this way, even if the station fails to read a user field including the AID of the station because the station does not correctly read an NDPA frame, the station can determine, based on the NDP, that the station is a station that needs to perform channel sounding and feed back a beamforming report based on a channel sounding result, so that a success rate of obtaining the beamforming report by a Bfer can be improved.

In addition, after receiving the NDP, if a device that does not match the AID indicated by the AID subfield reads that the AID indicated by the AID subfield is inconsistent with an AID of the device, the device does not continue to receive the NDP, so that power consumption of the device that does not match the AID indicated by the AID subfield can be reduced.

In some implementations, if the user of the NDP is a plurality of stations, the AID indicated by the user field is 0, indicating that the NDP is sent through broadcast. In this implementation, an EHT-SIG of an NDPA frame sent before the NDP includes a plurality of station fields, and an AID subfield in the plurality of station fields indicates an AID of a station that needs to perform channel sounding and feed back a beamforming report. In this way, the station receives the NDP, and determines, based on that the AID subfield in the NDP is 0, that the user of the NDP is the plurality of stations. In this way, all stations that receive the NDP or stations corresponding to AIDs indicated by user fields in NDPA frames continue to receive the NDP, to obtain channel state information based on the NDP and feed back beamforming reports.

In some implementations, if the user of the NDP is an access point, the AID indicated by the AID subfield is a specified value. The specified value may be notified by the AP through broadcast, or may be a fixed value, for example, 2045, preset in a standard. It should be understood that the specified value may alternatively be another value.

In some implementations, the PPDU further includes a U-SIG, the U-SIG includes a format subfield and/or a compressed subfield, and the format subfield or the compressed subfield indicates that the PPDU is the NDP. In this way, after identifying the PPDU, the Bfee can identify, based on the format subfield or the compressed subfield, that the PPDU is the NDP. In this way, before it is calculated that a number of symbols of the data field of the PPDU is 0, the PPDU may be identified as the NDP, and the PPDU is read based on a format of the NDP, so that the Bfee can prepare in advance a procedure of calculating channel state information, obtain longer processing time, and improve NDP reading efficiency.

In some implementations, the PPDU further includes a U-SIG and an EHT-LTF, the U-SIG includes a number of space-time streams subfield that indicates a number of space-time streams, and a number of EHT-LTF symbols is greater than the number of space-time streams. In this way, in an aggregated PPDU transmission scenario, when a plurality of NDPs of a same structure are transmitted on different channels, even if spatial streams on the channels are different, quantities of EHT-LTF symbols of the NDPs transmitted on the channels may be the same. This helps align symbols of fields of the NDPs, to avoid out-of-band interference between different frequency bands.

According to a fourth aspect, this application further provides a PPDU transmission method, including: receiving a PPDU, where the PPDU is an NDP, the PPDU includes a universal signal field U-SIG, and the U-SIG includes a subfield indicating that the PPDU is a null data packet NDP; and performing channel estimation by using the NDP.

The PPDU is an NDP used for a standard after 802.11ax, and does not include a data field. The NDP is used by a Bfee to perform channel sounding.

In an implementation of this application, the U-SIG of the PPDU includes the subfield indicating that the PPDU is the NDP, and the device that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve NDP receiving efficiency.

Optionally, the subfield indicating that the PPDU is the NDP is an NDP indication subfield, a PPDU format subfield, or a subfield indicating a number of EHT-SIG symbols, in the U-SIG.

In some implementations, the PPDU further includes an extremely high throughput-short training field EHT-STF adjacent to and following the U-SIG. The EHT-STF closely follows the U-SIG. The NDP does not include an EHT-SIG. In this way, a structure of the NDP provided in this application is used for an EHT NDP. This helps implement, in an aggregated PPDU transmission scenario, when hybrid transmission is performed on the EHT NDP and an HE NDP, alignment between symbols of the NDPs transmitted on all channels, so that out-of-band interference between different frequency bands can be avoided.

The NDP does not include the EHT-SIG. The U-SIG may not indicate the number of EHT-SIG symbols or an MCS, and does not need to indicate a coding-related indication, for example, an LDPC extra symbol segment indication. A packet extension indication may use a fixed value, and therefore does not need to be indicated.

In this way, the U-SIG may not include the subfield indicating the number of EHT-SIG symbols, an MCS subfield, an LDPC extra symbol segment subfield, or a packet extension disambiguity subfield. Bits that are used to carry these fields in a U-SIG of a PPDU including a data field may be used to carry other information in the U-SIG of the NDP; or bits that are used to carry these fields may be used to carry other fields. For example, the bits that are used to carry these fields may be used to carry a subfield indicating a number of EHT-LTF symbols, so that the U-SIG of the NDP can include more information.

It should be understood that, in some optional implementations, based on a structure of an NDP shown in FIG. 9, the U-SIG may alternatively include the subfield indicating the number of EHT-SIG symbols. The subfield indicating the number of EHT-SIG symbols indicates that the number of EHT-SIG symbols is a specified value, to indicate that the PPDU is the NDP. The subfield indicating the number of EHT-SIG symbols may be, but is not limited to, a subfield indicating a number of EHT-SIG symbols or MU-MIMO users (a subfield indicating a number of EHT-SIG symbols/MU-MIMO users), or a number of EHT-SIG symbols subfield that is only used to indicate the number of EHT-SIG symbols.

Optionally, the U-SIG further includes a number of spatial streams subfield and/or a subfield indicating a number of extremely high throughput-long training (field EHT-LTF) symbols, and the number of spatial streams subfield and/or the subfield indicating the number of EHT-LTF symbols indicate/indicates a number of spatial streams and the number of EHT-LTF symbols. The subfield indicating the number of EHT-LTF symbols may be, for example, a number of EHT-LTF symbols, midamble periodicity and doppler subfield; or may be a number of EHT-LTF symbols subfield that individually indicates the number of EHT-LTF symbols.

According to a fifth aspect, this application further provides a PPDU transmission method, including: receiving a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2; and performing channel estimation by using the NDP.

The PPDU is an NDP used for a standard after 802.11ax, and does not include a data field. The NDP is used by a Bfee to perform channel sounding.

In the technical solutions of this application, the number of EHT-SIG symbols of the NDP is 1. A structure of the NDP can reduce the number of EHT-SIG symbols, so that overheads required for transmitting the NDP can be reduced.

In some implementations, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1. The subfield indicating the number of EHT-SIG symbols may be, but is not limited to, a subfield indicating a number of EHT-SIG symbols or MU-MIMO users, or a number of EHT-SIG symbols subfield that is only used to indicate the number of EHT-SIG symbols.

The subfield indicating the number of EHT-SIG symbols indicates that the number of EHT-SIG symbols is 1, and the Bfee that receives the NDP can calculate that a length of the data field in the PPDU is 0, to determine that the PPDU is the NDP. The subfield indicating the number of EHT-SIG symbols indicates that the number of EHT-SIG symbols is greater than 1, and the Bfee can calculate that the length of the data field in the PPDU is less than 0, to determine that the PPDU is the NDP.

In some implementations, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2. In this way, the Bfee can identify, without calculating a number of symbols of the data field, that the PPDU is the NDP. In this way, the Bfee can prepare in advance a procedure of calculating channel state information, to obtain longer processing time, and does not need to determine, after calculating that a length of a data part of the PPDU is 0, that the PPDU is the NDP. The NDP helps improve efficiency of reading the NDP by the Bfee.

In some implementations, an NDP indication subfield or a PPDU format subfield in the U-SIG indicates that the PPDU is in an uncompressed mode. When the PPDU is in the uncompressed mode, the subfield indicating the number of EHT-SIG symbols or MU-MIMO users in the U-SIG indicates the number of EHT-SIG symbols. In this way, the subfield indicating the number of EHT-SIG symbols or MU-MIMO users can indicate that the number of EHT-SIG symbols is 1.

In some implementations, a number of space-time streams subfield and/or a subfield indicating a number of EHT-LTF symbols in the EHT-SIG indicate/indicates a number of space-time streams and the number of EHT-LTF symbols. The subfield indicating the number of EHT-LTF symbols may be, for example, a number of EHT-LTF symbols, midamble periodicity and doppler subfield; or may be a number of EHT-LTF symbols subfield that individually indicates the number of EHT-LTF symbols.

According to a sixth aspect, this application further provides a PPDU transmission method, including:
  receiving a PPDU, where the PPDU is an NDP, the PPDU includes an EHT-SIG, the EHT-SIG includes an AID subfield indicating an association identifier AID, and the AID is used to indicate information related to a user of the NDP; and
  performing channel estimation by using the NDP.

In this way, a Bfee can determine, based on the AID in the EHT-SIG of the NDP, the information related to the user of the NDP. In this way, the Bfee can accurately determine whether the Bfee is a user that needs to perform channel sounding and feed back a beamforming report.

The PPDU in this solution is an NDP used for a standard after 802.11ax, and does not include a data field. The NDP is used by the Bfee to perform channel sounding.

In some implementations, if the user of the NDP is one station, the AID indicated by the AID subfield is an AID of the station. In this way, the station corresponding to the AID can determine, based on the AID in the NDP, that the station is a station that needs to perform channel sounding and feed back a beamforming report based on a channel sounding result.

In this way, even if the station fails to read a user field including the AID of the station because the station does not correctly read an NDPA frame, the station can determine, based on the NDP, that the station is a station that needs to perform channel sounding and feed back a beamforming report based on a channel sounding result, so that a success rate of obtaining the beamforming report by a Bfer can be improved. In addition, after receiving the NDP, if a device that does not match the AID indicated by the AID subfield reads that the AID indicated by the AID subfield is inconsistent with an AID of the device, the device does not continue to receive the NDP, so that power consumption of the device that does not match the AID indicated by the AID subfield can be reduced.

In some implementations, if the user of the NDP is a plurality of stations, the AID indicated by the user field is 0, indicating that the NDP is sent through broadcast. In this implementation, an EHT-SIG of an NDPA frame sent before the NDP includes a plurality of station fields, and an AID subfield in the plurality of station fields indicates an AID of a station that needs to perform channel sounding and feed back a beamforming report. In this way, the station receives the NDP, and determines, based on that the AID subfield in the NDP is 0, that the user of the NDP is the plurality of stations. In this way, all stations that receive the NDP or stations corresponding to AIDs indicated by user fields in NDPA frames continue to receive the NDP, to obtain channel state information based on the NDP and feed back beamforming reports.

In some implementations, if the user of the NDP is an access point, the AID indicated by the AID subfield is a specified value. The specified value may be notified by the AP through broadcast, or may be a fixed value, for example, 2045, preset in a standard. It should be understood that the specified value may alternatively be another value.

In some implementations, the PPDU further includes a U-SIG, the U-SIG includes a format subfield and/or a compressed subfield, and the format subfield or the compressed subfield indicates that the PPDU is the NDP. In this way, after identifying the PPDU, the Bfee can identify, based on the format subfield or the compressed subfield, that the PPDU is the NDP. In this way, before it is calculated that a number of symbols of the data field of the PPDU is 0, the PPDU may be identified as the NDP, and the PPDU is read based on a format of the NDP, so that the Bfee can prepare in advance a procedure of calculating channel state information, obtain longer processing time, and improve NDP reading efficiency.

In some implementations, the PPDU further includes a U-SIG and an EHT-LTF, the U-SIG includes a number of space-time streams subfield that indicates a number of space-time streams, and a number of EHT-LTF symbols is greater than the number of space-time streams. In this way, in an aggregated PPDU transmission scenario, when a plurality of NDPs of a same structure are transmitted on different channels, even if spatial streams on the channels are different, quantities of EHT-LTF symbols of the NDPs transmitted on the channels may be the same. This helps align symbols of fields of the NDPs, to avoid out-of-band interference between different frequency bands.

According to a seventh aspect, this application further provides a transmission apparatus, including a processing unit and a sending unit. The processing unit is configured to generate a PPDU, where the PPDU includes a universal signal field U-SIG, and the U-SIG includes a subfield indicating that the PPDU is a null data packet NDP. The sending unit is configured to send the PPDU.

In this way, a Bfee that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve efficiency of receiving the NDP by the Bfee.

The transmission apparatus may be understood as a Bfer. The transmission apparatus may be, for example, an access point or a station. Alternatively, the transmission apparatus is deployed at an access point or a station.

In some implementations, the PPDU further includes an extremely high throughput-short training field EHT-STF adjacent to and following the U-SIG.

In some implementations, the subfield indicating that the PPDU is the NDP is an NDP indication subfield, a PPDU format subfield, or a subfield indicating a number of EHT-SIG symbols, in the U-SIG.

In some implementations, the U-SIG further includes a number of spatial streams subfield and/or a subfield indicating a number of extremely high throughput-long training field (EHT-LTF) symbols, and the number of spatial streams subfield and/or the subfield indicating the number of EHT-LTF symbols indicate/indicates a number of spatial streams and the number of EHT-LTF symbols.

According to an eighth aspect, this application further provides a transmission apparatus, including a processing unit and a sending unit. The processing unit is configured to generate a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2. The sending unit is configured to send the PPDU. In this way, the number of EHT-SIG symbols can be reduced, so that overheads required for transmitting the NDP can be reduced.

The transmission apparatus may be understood as a Bfer. The transmission apparatus may be, for example, an access point or a station. Alternatively, the transmission apparatus is deployed at an access point or a station.

In some implementations, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1.

In some implementations, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2.

In some implementations, an NDP indication subfield or a PPDU format subfield in the U-SIG indicates that the PPDU is in an uncompressed mode.

In some implementations, a number of space-time streams subfield and/or a subfield indicating a number of EHT-LTF symbols in the EHT-SIG indicate/indicates a number of space-time streams and the number of EHT-LTF symbols.

According to a ninth aspect, this application further provides a transmission apparatus, including a processing unit and a sending unit. The processing unit is configured to generate a PPDU, where the PPDU is an NDP, the PPDU includes an EHT-SIG, the EHT-SIG includes an AID subfield indicating an association identifier AID, and the AID is used to indicate information related to a user of the NDP. The sending unit is configured to send the PPDU.

In this way, a Bfee can determine, based on the AID in the EHT-SIG of the NDP, the information related to the user of the NDP. In this way, the Bfee can accurately determine whether the Bfee is a user that needs to perform channel sounding and feed back a beamforming report.

The transmission apparatus may be understood as a Bfer. The transmission apparatus may be, for example, an access point or a station. Alternatively, the transmission apparatus is deployed at an access point or a station.

In some implementations, if the user of the NDP is one station, the AID indicated by the AID subfield is an AID of the station.

In some implementations, if the user of the NDP is a plurality of stations, the AID indicated by the user field is 0, indicating that the NDP is sent through broadcast.

In some implementations, if the user of the NDP is an access point, the AID indicated by the AID subfield is a specified value.

In some implementations, the PPDU further includes a U-SIG, the U-SIG includes a format subfield and/or a compressed subfield, and the format subfield or the compressed subfield indicates that the PPDU is the NDP.

In some implementations, the PPDU further includes a U-SIG and an EHT-LTF, the U-SIG includes a number of space-time streams subfield that indicates a number of space-time streams, and a number of EHT-LTF symbols is greater than the number of space-time streams.

According to a tenth aspect, this application further provides a transmission apparatus, including a receiving unit and a processing unit. The receiving unit is configured to receive a PPDU, where the PPDU is an NDP, the PPDU includes a universal signal field U-SIG, and the U-SIG includes a subfield indicating that the PPDU is a null data packet NDP. The processing unit is configured to perform channel estimation by using the NDP.

In this way, a Bfee that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve efficiency of receiving the NDP by the Bfee.

The transmission apparatus may be understood as the Bfee. The transmission apparatus may be, for example, a station or an access point. Alternatively, the transmission apparatus is deployed at a station or an access point.

In some implementations, the PPDU further includes an extremely high throughput-short training field EHT-STF adjacent to and following the U-SIG.

In some implementations, the subfield indicating that the PPDU is the NDP is an NDP indication subfield, a PPDU format subfield, or a subfield indicating a number of EHT-SIG symbols, in the U-SIG.

In some implementations, the U-SIG further includes a number of spatial streams subfield and/or a subfield indicating a number of extremely high throughput-long training field (EHT-LTF) symbols, and the number of spatial streams subfield and/or the subfield indicating the number of EHT-LTF symbols indicate/indicates a number of spatial streams and the number of EHT-LTF symbols.

According to an eleventh aspect, this application further provides a transmission apparatus, including a receiving unit and a processing unit. The receiving unit is configured to receive a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2. The processing unit is configured to perform channel estimation by using the NDP. In this way, the number of EHT-SIG symbols can be reduced, so that overheads required for transmitting the NDP can be reduced.

The transmission apparatus may be understood as a Bfee. The transmission apparatus may be, for example, a station or an access point. Alternatively, the transmission apparatus is deployed at a station or an access point.

In some implementations, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1.

In some implementations, an NDP indication subfield or a PPDU format subfield in the U-SIG indicates that the PPDU is in an uncompressed mode.

In some implementations, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2.

In some implementations, a number of space-time streams subfield and/or a subfield indicating a number of EHT-LTF symbols in the EHT-SIG indicate/indicates a number of space-time streams and the number of EHT-LTF symbols.

According to a twelfth aspect, this application further provides a transmission apparatus, including a receiving unit and a processing unit. The receiving unit is configured to receive a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2. The processing unit is configured to perform channel estimation by using the NDP.

In this way, a Bfee can determine, based on an AID in the EHT-SIG of the NDP, information related to a user of the NDP. In this way, the Bfee can accurately determine whether the Bfee is a user that needs to perform channel sounding and feed back a beamforming report.

The transmission apparatus may be understood as the Bfee. The transmission apparatus may be, for example, a station or an access point. Alternatively, the transmission apparatus is deployed at a station or an access point.

In some implementations, if the user of the NDP is one station, the AID indicated by an AID subfield is an AID of the station.

In some implementations, if the user of the NDP is a plurality of stations, the AID indicated by the user field is 0, indicating that the NDP is sent through broadcast.

In some implementations, if the user of the NDP is an access point, the AID indicated by the AID subfield is a specified value.

In some implementations, the PPDU further includes a U-SIG, the U-SIG includes a format subfield and/or a compressed subfield, and the format subfield or the compressed subfield indicates that the PPDU is the NDP.

In some implementations, the PPDU further includes a U-SIG and an EHT-LTF, the U-SIG includes a number of space-time streams subfield that indicates a number of space-time streams, and a number of EHT-LTF symbols is greater than the number of space-time streams.

For related descriptions of the implementations of the foregoing transmission apparatuses, refer to related content of the implementations of the foregoing PPDU transmission method. Details are not described herein again.

According to a thirteenth aspect, an implementation of this application further provides a PPDU transmission apparatus. The transmission apparatus may include a processor and a transceiver, and optionally further includes a memory. When the processor executes a computer program or instructions in the memory, the method according to any one of the implementations of the first aspect to the sixth aspect is performed. The transmission apparatus may be understood as a communication apparatus. The transmission apparatus may be a station or an access point.

According to a fourteenth aspect, an implementation of this application further provides a computer-readable storage medium. The computer-readable storage medium stores instructions, and the instructions indicate a communication apparatus to perform the method according to any one of the implementations of the first aspect to the sixth aspect.

According to a fifteenth aspect, an implementation of this application further provides a computer program product. The computer program product includes a computer program. When the computer program runs on a computer, the computer is enabled to perform the method according to any one of the implementations of the first aspect to the sixth aspect.

According to a sixteenth aspect, this application further provides a processor, configured to perform the method according to any one of the implementations of the first aspect to the sixth aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information.

Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in implementations of the present disclosure.

According to a seventeenth aspect, this application provides a chip system. The chip system includes a processor and an interface, configured to support a communication transmission device in implementing a function in the method according to any one of the first aspect to the sixth aspect, for example, determining or processing at least one of data and information in the foregoing method. In a possible design, the chip system further includes a memory, and the memory is configured to store information and data that are necessary for the foregoing PPDU transmission apparatus. The chip system may include a chip, or may include a chip and another discrete device.

According to an eighteenth aspect, this application provides a functional entity. The functional entity is configured to implement the method according to any one of the first aspect to the sixth aspect.

BRIEF DESCRIPTION OF DRAWINGS

FIG. 4A is a schematic diagram of a structure of an HE SU PPDU including a data field;

FIG. 4B is a schematic diagram of a structure of an HE MU PPDU including a data field;

FIG. 4C is a schematic diagram of a structure of an HE NDP;

FIG. 5 is a schematic diagram of a structure of an EHT PPDU including a data field according to an embodiment of this application;

FIG. 7 is a schematic diagram of an aggregated PPDU transmission scenario according to an embodiment of this application;

FIG. 8 is a schematic diagram of another aggregated PPDU transmission scenario according to an embodiment of this application;

FIG. 9 is a schematic diagram of a structure of an NDP according to an embodiment of this application;

FIG. 10 is a schematic diagram of still another aggregated PPDU transmission scenario according to an embodiment of this application;

FIG. 11 is a schematic diagram of a structure of an NDP according to another embodiment of this application;

DESCRIPTION OF EMBODIMENTS

The following describes technical solutions in this application with reference to the accompanying drawings.

Figure 1:
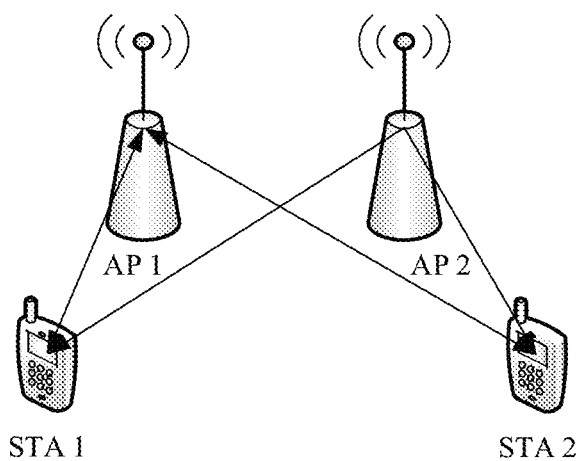
FIG. 1 is a schematic diagram of a network architecture of a communication system according to an embodiment of this application.

For example, FIG. 1 shows a structure of a network used in a data transmission method in this application. FIG. 1 is a schematic diagram of the structure of the network according to an embodiment of this application. The structure of the network may include one or more access point (AP) stations and one or more non-access-point stations (non-AP STAs). For ease of description, the access point station is referred to as an access point (AP), and the non-access-point station is referred to as a station (STA) in this specification. APs are, for example, an AP 1 and an AP 2 in FIG. 1, and STAs are, for example, a STA 1, a STA 2, and a STA 3 in FIG. 1.

The access point may be an access point for a terminal device (for example, a mobile phone) to access a wired (or wireless) network, and is mainly deployed at home, in a building, and in a park. A typical coverage radius is tens of meters to hundreds meters. Certainly, the access point may alternatively be deployed outdoors. The access point is equivalent to a bridge that connects a wired network and a wireless network. A main function of the access point is to connect various wireless network clients together and then connect the wireless network to an Ethernet. Specifically, the access point may be a terminal device (for example, a mobile phone) or a network device (for example, a router) with a wireless fidelity (Wi-Fi) chip.

The access point may be a device that supports the 802.11be standard. Alternatively, the access point may be a device that supports a plurality of wireless local area network (WLAN) standards of the 802.11 family such as 802.11ax, 802.11ac, 802.11n, 802.11g, 802.11b, and 802.11a. The access point in this application may be a high efficient (HE) AP or an extremely high throughput (EHT) AP, or may be an access point applicable to a future Wi-Fi standard.

The access point may include a processor and a transceiver. The processor is configured to control and manage an action of the access point, and the transceiver is configured to receive or send information.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function.

Optionally, the station may support the 802.11be standard. The station may alternatively support a plurality of wireless local area network (WLAN) standards of the 802.11 family such as 802.11ax, 802.11ac, 802.11n, 802.11g, 802.11b, and 802.11a.

The station may include a processor and a transceiver. The processor is configured to control and manage an action of the access point, and the transceiver is configured to receive or send information.

The access point in this application may be a high efficient (HE) STA or an extremely high throughput (EHT) STA, or may be a STA applicable to a future Wi-Fi standard.

For example, the access point and the station may be devices applied to the internet of vehicles, internet of things nodes or sensors in the internet of things (IoT), smart cameras, smart remote controls, or smart meters/water meters in a smart home, or sensors in a smart city.

The access point and the station in embodiments of this application may also be collectively referred to as PPDU transmission apparatuses. The PPDU transmission apparatus may include a hardware structure and a software module, and the foregoing functions are implemented in a form of a hardware structure, a software module, or a combination of the hardware structure and the software module. One of the foregoing functions may be implemented in a form of a hardware structure, a software module, or a combination of the hardware structure and the software module.

Figure 2:
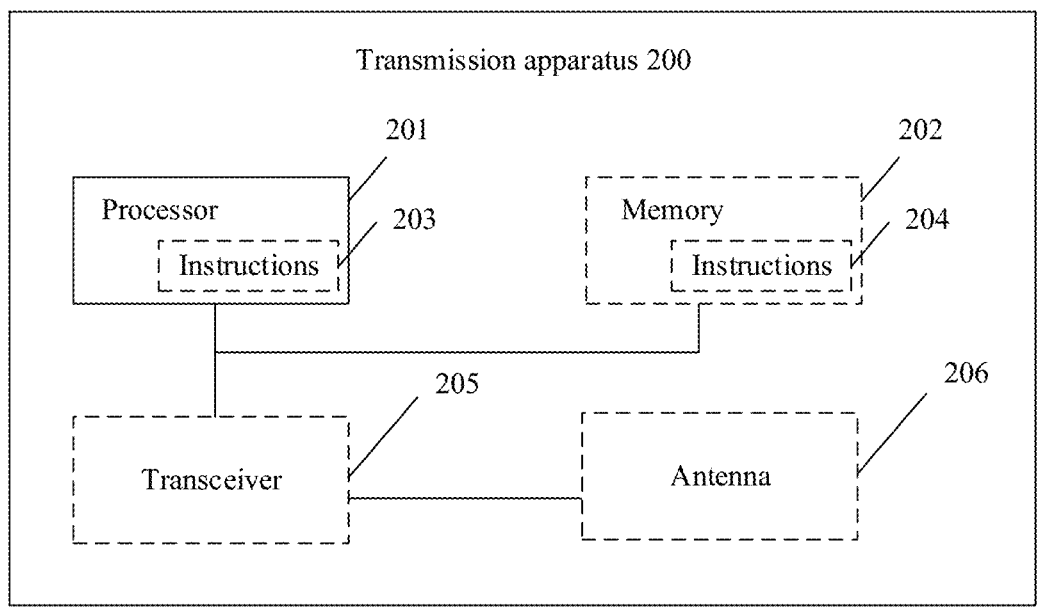
FIG. 2 is a schematic diagram of a structure of a PPDU transmission apparatus according to an embodiment of this application.

FIG. 2 is a schematic diagram of a structure of a PPDU transmission apparatus 200 according to an embodiment of this application. As shown in FIG. 2, the transmission apparatus 200 may include a processor 201 and a transceiver 205, and optionally further includes a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or an instruction 204, where the computer program, the software code, or the instruction 204 may also be referred to as firmware. The processor 201 may control a MAC layer and a PHY layer by running a computer program, software code, or an instruction 203 in the processor 201, or by invoking the computer program, the software code, or the instruction 204 stored in the memory 202, to implement the data transmission method provided in the following embodiments of this application.

The processor 201 may be a central processing unit (CPU), and the memory 202 may be, for example, a read-only memory (ROM), or a random access memory (RAM).

The processor 201 and the transceiver 205 described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like.

The transmission apparatus 200 may further include an antenna 206. The modules included in the transmission apparatus 200 are merely examples for description. This is not limited in this application.

As described above, the transmission apparatus 200 described in the foregoing embodiment may be an access point or a station. However, the scope of the transmission apparatus described in this application is not limited thereto, and the structure of the transmission apparatus may not be limited in FIG. 2. The transmission apparatus may be an independent device, or may be a part of a relatively large device. For example, the transmission apparatus may be implemented in the following form:

(1) an independent integrated circuit IC, a chip, a chip system, or a subsystem;
(2) a set including one or more ICs, where optionally, the set of ICs may also include a storage component for storing data and instructions;
(3) a module that can be embedded in another device;
(4) a receiver, an intelligent terminal, a wireless device, a handheld device, a mobile unit, a vehicle-mounted device, a cloud device, an artificial intelligence device, or the like; or
(5) others.

Figure 3:
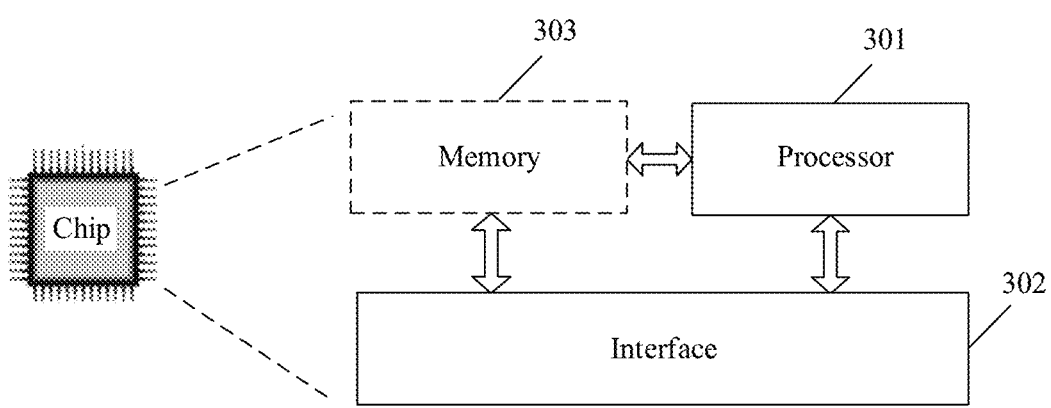
FIG. 3 is a schematic diagram of a structure of a chip according to an embodiment of this application.

For the transmission apparatus implemented in the form of the chip or the chip system, refer to a schematic diagram of a structure of a chip or a chip system shown in FIG. 3. The chip or the chip system shown in FIG. 3 includes a processor 301 and an interface 302. There may be one or more processors 301, and there may be a plurality of interfaces 302. Optionally, the chip or the chip system may include a memory 303.

Embodiments of this application do not limit the protection scope and applicability of the claims. Persons skilled in the art may adaptively change functions and deployments of elements in this application, or omit, replace, or add various processes or components as appropriate without departing from the scope of embodiments of this application.

In a related technology, a device that sends an NDPA frame and an NDP may be understood as a beamformer (Bfer), and a device that receives the NDPA frame and the NDP, and feeds back a beamforming report based on the NDPA frame and the NDP may be understood as a beamformee (Bfee). The Bfer may be an AP or a STA. The Bfee may be a STA or an AP.

In 802.11ax, different PPDUs are separately designed for scenarios in which a network device performs single user (SU) transmission and multiple user (MU) transmission.

In 802.11ax, in a scenario in which a network device performs single user (SU) transmission, a PPDU transmitted by the network device is an HE SU PPDU. FIG. 4A is a schematic diagram of a structure of an HE SU PPDU in 802.11ax. The HE SU PPDU includes a legacy short training field (L-STF), a legacy long training field (L-LTF), a legacy signal field (L-SIG), a repeated legacy signal field (RL-SIG), a high efficient signal field A (HE-SIG A), a high efficient short training field (HE-STF), a high efficient long training field (HE-LTF), a data field, and a packet extension (PE) field. The L-SIG and the RL-SIG have a same length, and duration of fields that follow the L-SIG and that are indicated by the L-SIG is not an integer multiple of 3.

In 802.11ax, in a scenario in which a network device performs multiple user (MU) transmission, a PPDU transmitted by the network device is an HE MU PPDU. FIG. 4B is a schematic diagram of a structure of an HE MU PPDU in 802.11ax. The HE MU PPDU includes an L-STF, an L-LTF, an L-SIG, an RL-SIG, an HE-SIG A, an HE-SIG B, an HE-STF, an HE-LTF, a data field, and a PE field. The L-SIG and the RL-SIG have a same length, and duration of fields that follow the L-SIG and that are indicated by the L-SIG is not an integer multiple of 3.

In 802.11ax, an HE NDP for an HE PPDU is designed. FIG. 4C is a schematic diagram of a structure of an HE NDP in 802.11ax. The HE NDP includes an L-STF, an L-LTF, an L-SIG, an RL-SIG, an HE-SIG A, an HE-STF, an HE-LTF, and a PE field.

The PPDU is classified into an NDP and a PPDU including a data field. The NDP is a PPDU that does not include the data field, and may be understood as a special PPDU.

When receiving an NDP, a Bfee first determines, based on an L-SIG and an RL-SIG, a specific generation of a standard to which a version of a received PPDU belongs, and then calculates that a number of symbols of a data field is 0, to determine that the received PPDU is the NDP.

Specifically, the Bfee detects the L-SIG and the RL-SIG, and if the two fields are the same and duration of fields that follow the L-SIG and that are indicated by the L-SIG is not a multiple of 3, the Bfee determines that the received signal is an HE PPDU. The L-SIG includes length indication information, indicating a sum of lengths of all fields following the L-SIG in terms of time. Lengths of an HE-SIG-A and an HE-STF are fixed. The Bfee can calculate, based on the lengths of the HE-SIG-A and the HE-STF, a number of HE-LTFs indicated by the HE-SIG-A, a length of a guard interval, a size of the HE-LTF, and a packet extension related parameter, that a length of the data field is 0, to determine that the received HE PPDU is an HE NDP.

For 802.11be under discussion, a related technology provides a structure of an EHT PPDU that includes a data field and that corresponds to 802.11be. FIG. 5 is a schematic diagram of a structure of a possible EHT PPDU. The EHT PPDU includes an L-STF, an L-LTF, an L-SIG, an RL-SIG, a U-SIG, an EHT-SIG, an EHT-STF, an EHT-LTF, a data field, and a PE field. The L-SIG and the RL-SIG have a same length, and duration of fields that follow the L-SIG and that are indicated by the L-SIG is an integer multiple of 3.

The U-SIG and the EHT-SIG are signal fields. The U-SIG is used to carry some common information, for example, information indicating a PPDU version, information indicating uplink/downlink, information indicating a frequency domain bandwidth of the PPDU, and puncture indication information. The EHT-SIG includes information indicating resource allocation, information indicating data demodulation, and the like.

Table 1 shows a possible structure of a U-SIG of an EHT PPDU including a data field. The U-SIG includes a physical layer version identifier indication subfield, an uplink/a downlink (UL/DL) indication subfield, a basic service set color (BSS color) subfield, a transmit opportunity (TXOP) subfield, a bandwidth and preamble puncture indication subfield, a PPDU format subfield, a space-time block coding (STBC) subfield, a spatial reuse indication subfield, a guard interval (GI) and EHT-LT size subfield, a low density parity check extra symbol segment (LDPC extra symbol segment) subfield, a pre-forward error correction padding factor (Pre-FEC padding factor) subfield, a packet extension disambiguity (PE disambiguity) subfield, a number of EHT-SIG symbols or MU-MIMO users subfield, an EHT-SIG modulation and coding scheme (EHT-SIG MCS) and dual-carrier modulation (DCM) subfield, a cyclic redundancy code (CRC), and a tail bit (tail).

TABLE 1

| Bit | Field |
| --- | --- |
| B0-B2 (U-SIG-1) | Physical layer version identifier (version identifier) |
| B3 | Uplink/downlink (UL/DL) |
| B4-B9 | Basic service set color (BSS color) |
| B10-B16 | Transmit opportunity (TXOP) |
| B17-22 | Bandwidth (bandwidth) and preamble puncture (preamble puncture) |
| B23-B24 | PPDU format (PPDU format) |
| B25 | Space-time block coding (STBC) |
| B0-B1 (U-SIG-2) | Spatial reuse (spatial reuse) |
| B2-B3 | Guard interval (GI) and EHT-LTF size (EHT-LTF size) |
| B4 | Low density parity check extra symbol segment (LDPC extra symbol segment) |
| B5-B6 | Pre-forward error correction padding factor (Pre-FEC padding factor) |
| B7 | Packet extension disambiguity (PE disambiguity) |
| B8-B12 | Number of EHT-SIG symbols or MU-MIMO users (number of EHT-SIG symbols or MU-MIMO users) |
| B13-B15 | EHT-SIG modulation and coding scheme (MCS) and dual-carrier modulation (DCM) |
| B16-B19 | Cyclic redundancy code (CRC) |
| B20-B25 | Tail bit (tail) |

The physical layer version indication subfield is used to indicate a generation of the PPDU. The uplink/downlink indication subfield is used to indicate uplink or downlink. The BSS color subfield indicates a color identifier of a BSS in which a Bfer is located. The bandwidth and preamble puncture indication subfield indicates a bandwidth and preamble puncture information of a data packet. The PPDU format subfield is used to indicate a PPDU format. The STBC subfield indicates whether STBC is used for a data part. The low density parity check extra symbol segment subfield indicates whether an extra symbol segment is transmitted after LDPC coding is used. The pre-forward error correction padding factor subfield indicates a pre-forward error correction padding factor. The packet extension disambiguity subfield indicates whether packet extension is ambiguous. The subfield indicating the number of EHT-SIG symbols or MU-MIMO users indicates the number of EHT-SIG symbols or the number of MU-MIMO users. The EHT-SIG MCS and DCM subfield indicates an EHT-SIG MCS and whether DCM is used. The CRC is used to verify information. The tail bit is used to end coding.

Table 2 shows a possible structure of an EHT-SIG of an EHT PPDU including a data field. The EHT-SIG of the EHT PPDU includes a number of EHT-LTF symbols, midamble periodicity and doppler (number of EHT-LTF symbols, midamble periodicity and doppler) subfield, a preamble puncture indication subfield, a cyclic redundancy code (CRC), a tail bit (tail), a station identification information subfield, a number of space-time streams (NSTS) subfield, a coding subfield, a modulation and coding scheme (MCS) subfield, a beam change subfield, a beamformed subfield, a CRC, and a tail bit. A number of bits of each subfield in Table 2 is a number of information bits before coding.

TABLE 2

| Bit | Subfield |
| --- | --- |
| B0-B3 | Number of EHT-LTF symbols, midamble periodicity and doppler |
| B4-B11 | Preamble puncture indication |
| B12-B15 | Cyclic redundancy code (CRC) |
| B16-B21 | Tail bit (tail) |
| B22-B32 | Station identification information |
| B33-B36 | Number of space-time streams (NSTS) |
| B37 | Coding |
| B38-B41 | Modulation and coding scheme (MCS) |
| B42 | Beam change |
| B43 | Beamformed |
| B44-B47 | Cyclic redundancy code (CRC) |
| B48-B53 | Tail bit (tail) |

The number of EHT-LTF symbols, midamble periodicity and doppler subfield is used to indicate a number of EHT-LTF symbols, a midamble periodicity, and doppler. The number of EHT-LTF symbols, midamble periodicity and doppler subfield may be understood as a subfield indicating the number of EHT-LTF symbols. The preamble puncture indication subfield is used to indicate a preamble puncture mode. The station identification information subfield is used to indicate an association identifier (AID). The coding subfield indicates a specific coding mode. The modulation and coding scheme subfield indicates a modulation and coding scheme of a data part. The beam change subfield indicates whether a beam change is applied. The beamformed subfield indicates whether beamforming is used.

It should be understood that the EHT-SIG of the EHT PPDU includes a common field and a user-specific field. The user-specific field includes one or more user fields. The number of EHT-LTF symbols, midamble periodicity and doppler subfield, the preamble puncture indication subfield, the cyclic redundancy code, and the tail bit that correspond to B0 to B21 are common fields. The station identification information subfield, the number of space-time streams subfield, the coding subfield, the modulation and coding scheme subfield, the beam change subfield, the beamformed subfield, the CRC, and the tail bit that correspond to B22 and bits after B22 are user-specific fields.

The station identification information subfield, the number of space-time streams subfield, the coding subfield, the modulation and coding scheme subfield, the beam change subfield, the beamformed subfield are a group of user fields. Usually, two user fields form a group, and every two user fields are followed by a CRC and a tail field. If a number of user fields is an odd number, the last user field forms a group, and the last user field is followed by a CRC and a tail field.

It can be learned that in Table 2, the number of user fields is 1, and in this case, a number of EHT-SIG symbols is the smallest. When BPSK and a code rate of 1/2 are used, a number of EHT-SIG symbols obtained through coding is 2. In this case, it may be considered that in the EHT PPDU including the data field, the number of EHT-SIG symbols is greater than or equal to 2.

However, for 802.11be under discussion, 802.11be provides only the structure of the EHT PPDU including the data field shown in FIG. 5, and does not involve a structure of an EHT PPDU not including a data field, that is, does not provide an EHT NDP that satisfies the 802.11be standard. In this way, an AP and a STA cannot perform NDP measurement to obtain channel state information.

Based on the foregoing background, this application provides structures of some NDPs used for a standard after 802.11ax. In this way, in a scenario in which wireless communication is performed by using the standard (for example, 802.11be) after 802.11ax, a Bfee can perform channel estimation based on an NDP to feed back a beamforming report.

With reference to the PPDU transmission method provided in embodiments of this application, the following describes a structure of an NDP provided in technical solutions of this application.

Figure 6:
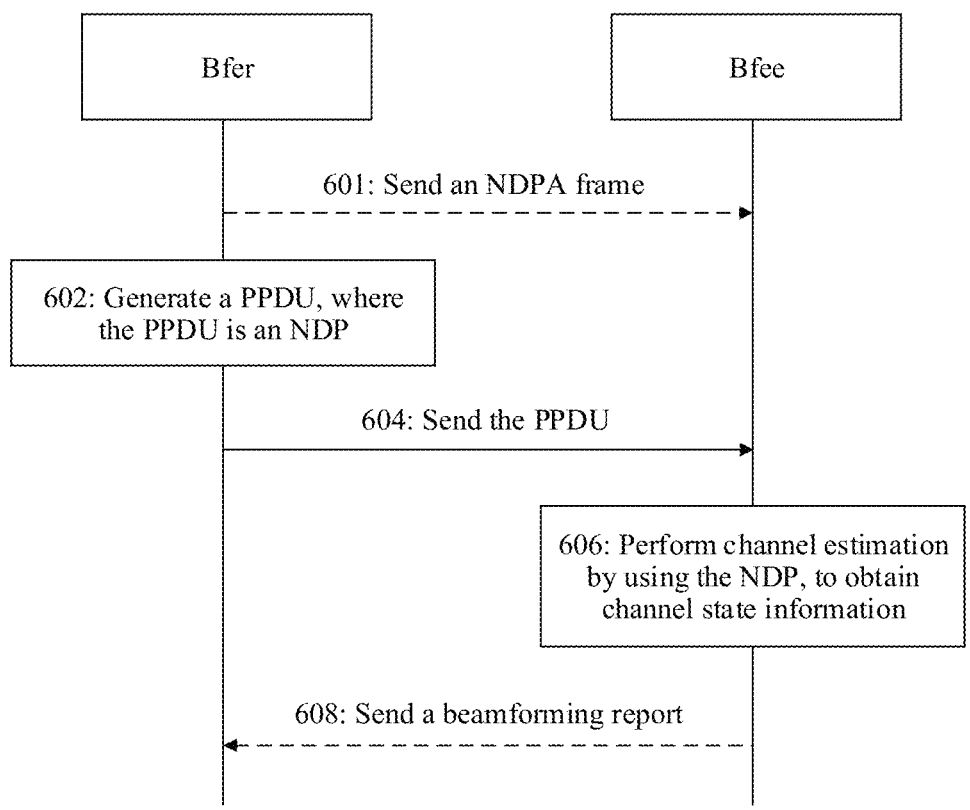
FIG. 6 is a schematic flowchart of a PPDU transmission method according to an embodiment of this application.

FIG. 6 is a schematic flowchart of a PPDU transmission method according to an embodiment of this application. The method may include the following steps.

602: A Bfer generates a PPDU.

The PPDU is an NDP used for a standard after 802.11ax, and does not include a data field. The NDP is used by a Bfee to perform channel sounding. The channel sounding in this application may also be referred to as channel measurement or channel estimation.

The NDP may be any NDP that are used for the standard after 802.11ax and that are provided below in this embodiment of this application.

A first type of NDP provided in this embodiment of this application includes a subfield indicating that the PPDU is the NDP. In this way, the Bfee that receives the NDP can identify the NDP earlier. This helps improve efficiency of reading the NDP by the Bfee.

A second type of NDP provided in this embodiment of this application includes an EHT-SIG, a number of EHT-SIG symbols is 1, a modulation scheme used for the EHT-SIG is BPSK, and a modulation code rate used for the EHT-SIG is a code rate of 1/2. In this way, in comparison with the EHT-SIG of the PPDU including the data field shown in Table 2, the number of EHT-SIG symbols is smaller, so that overheads required for transmitting the NDP can be reduced.

A third type of NDP provided in this embodiment of this application includes an AID subfield, and the AID subfield is used to indicate information related to a user of the NDP. In this way, the Bfee that receives the NDP can determine, based on an AID in the EHT-SIG of the NDP, the information related to the user of the NDP, to accurately determine whether the Bfee is a user that needs to perform channel sounding and feed back a beamforming report.

It should be understood that names of related fields (for example, fields such as an EHT-STF, an SHT-LTF, and the EHT-SIG) in the several NDPs provided in this embodiment of this application are determined according to the 802.11be standard after 802.11ax. The names of the related fields in the several NDPs provided in this embodiment of this application may alternatively be replaced with names of fields related to the standard after 802.11ax. In this embodiment of this application, the NDP includes a plurality of subfields. Names of the subfields are not limited in this embodiment of this application. In another embodiment, the names of the subfields may be replaced with other names.

604: The Bfer sends the PPDU.

Correspondingly, the Bfee receives the PPDU.

606: The Bfee performs channel estimation by using the NDP to obtain channel state information.

Optionally, after the channel state information is obtained, the method may further include step 608: The Bfee may send a beamforming report including the channel state information to the Bfer.

In this way, in a scenario in which wireless communication is performed by using the standard (for example, 802.11be) after 802.11ax, the Bfee can perform channel estimation based on the NDP, to obtain the channel state information and feed back the beamforming report to the Bfer.

In this embodiment of this application, the Bfer may be an AP or a STA. The Bfee may be a STA or an AP.

Optionally, before step 602, the method further includes:

601: The Bfer sends an NDPA frame, where the NDPA frame may include a station information field, and the station information field includes an AID subfield used to indicate an AID of a station that needs to perform channel sounding and feed back a beamforming report. In this way, the Bfee can determine, based on the AID subfield in the NDPA frame, whether the Bfee needs to obtain channel state information. If yes, the Bfee may obtain, by using the NDP and based on partial bandwidth information indicated in the NDPA frame, channel state information within a frequency range corresponding to the partial bandwidth information.

The following specifically describes specific structures and corresponding technical effects of the several NDPs that are used for the standard after 802.11ax and that are involved in the steps of the foregoing method.

In some possible implementations, the NDP transmitted in the PPDU transmission method in this embodiment of this application uses a structure of the first type of NDP provided in this embodiment of this application.

The first type of NDP provided in this embodiment of this application includes a U-SIG, and the U-SIG includes a subfield indicating that the PPDU is the NDP. The Bfee that receives the NDP can determine, based on the subfield, in the U-SIG, indicating that the PPDU is the NDP, that the PPDU is the NDP, so that the Bfee can prepare in advance a procedure of calculating the channel state information, to obtain longer processing time, and does not need to determine, after calculating that a length of a data part of the PPDU is 0, that the PPDU is the NDP. The NDP helps improve the efficiency of receiving the NDP by the Bfee.

The U-SIG may include at least one of an NDP indication subfield, a PPDU format subfield, or a subfield indicating a number of EHT-SIG symbols. The subfield indicating that the PPDU is the NDP is the NDP indication subfield, the PPDU format subfield, or the subfield indicating the number of EHT-SIG symbols, in the U-SIG.

Specifically, in some embodiments, the U-SIG includes the NDP indication subfield, the PPDU format subfield, or the subfield indicating the number of EHT-SIG symbols. Any one of the NDP indication subfield, the PPDU format subfield, or the subfield indicating the number of EHT-SIG symbols is the subfield indicating that the PPDU is the NDP.

In some other embodiments, the U-SIG includes the NDP indication subfield and the PPDU format subfield, where either of the NDP indication subfield and the PPDU format subfield is the subfield indicating that the PPDU is the NDP; the U-SIG includes the PPDU format subfield and the subfield indicating the number of EHT-SIG symbols, where either of the PPDU format subfield and the subfield indicating the number of EHT-SIG symbols is the subfield indicating that the PPDU is the NDP; or the U-SIG includes the NDP indication subfield and the subfield indicating the number of EHT-SIG symbols, where either of the NDP indication subfield and the subfield indicating the number of EHT-SIG symbols is the subfield indicating that the PPDU is the NDP.

In some still other embodiments, the U-SIG includes the NDP indication subfield, where the NDP indication subfield is the subfield indicating that the PPDU is the NDP; the U-SIG includes the PPDU format subfield, where the PPDU format subfield is the subfield indicating that the PPDU is the NDP; or the U-SIG includes the subfield indicating the number of EHT-SIG symbols, where the subfield indicating the number of EHT-SIG symbols is the subfield indicating that the PPDU is the NDP.

The subfield indicating the number of EHT-SIG symbols may be, but is not limited to, a subfield indicating a number of EHT-SIG symbols or MU-MIMO users, or a number of EHT-SIG symbols subfield that is only used to indicate the number of EHT-SIG symbols.

The subfield indicating the number of EHT-SIG symbols may indicate, for example, that the number of EHT-SIG symbols is a specified value, to indicate that the PPDU is the NDP. For example, the subfield indicating the number of EHT-SIG symbols may indicate, for example, that the number of EHT-SIG symbols is 0, to indicate that the PPDU is the NDP.

In a related technology, FIG. 7 is a schematic diagram of structures of PPDUs transmitted on channels in an aggregated PPDU transmission scenario. Four different channels in frequency domain are respectively used to transmit an HE MU PPDU including a data field and three EHT PPDUs, where each of the three EHT PPDU includes a data field. The HE MU PPDU including the data field does not include a U-SIG or an EHT-SIG, but includes an HE-SIG A and an HE-SIG B. Positions and numbers of symbols of the HE-SIG A and the HE-SIG B in the HE MU PPDU including the data field are the same as positions and numbers of symbols of the U-SIG and the EHT-SIG. In this way, it can be ensured that symbols of the PPDUs transmitted on all the channels are aligned, so that out-of-band interference between different frequency bands is avoided.

However, an HE NDP includes only an HE-SIG A having two symbols, but does not include an HE-SIG B. If a corresponding EHT NDP is designed based on a format of the EHT PPDU including the data field shown in FIG. 5, the EHT NDP includes the EHT-SIG. In an aggregated PPDU structure shown in FIG. 8, if hybrid transmission is performed on an HE NDP and an EHT NDP that is designed based on the format of the EHT PPDU including the data field shown in FIG. 5, symbols of the PPDUs transmitted on all the channels are not aligned, causing out-of-band interference between different frequency bands.

FIG. 9 is a schematic diagram of a structure of an NDP according to an embodiment of this application. In the first type of NDP provided in embodiments of this application, the NDP further includes an EHT-STF adjacent to and following the U-SIG. The EHT-STF closely follows the U-SIG. The NDP does not include an EHT-SIG. In this way, an EHT NDP uses the structure of the first type of NDP in this application. This helps implement symbol alignment between the EHT NDP and an HE NDP.

Optionally, the first type of NDP in this application may further include an L-STF, an L-LTF, an L-SIG, an RL-SIG, an EHT-STF, an EHT-LTF, and a PE field.

The L-STF, the L-LTF, and the L-SIG are used to ensure coexistence between a new device and a conventional device. The L-SIG includes a field indicating a length, and can indicate a number of symbols in each of fields following the L-SIG. The RL-SIG is used to enhance reliability of a legacy signal field. The EHT-STF is used for automatic gain control on subsequent fields. The EHT-LTF is used for channel estimation.

The L-SIG and the RL-SIG are the same, and duration of fields that follow the L-SIG and that are indicated by the length field in the L-SIG is an integer multiple of 3. In this way, the Bfee can identify, by detecting the L-SIG and the RL-SIG and identifying that the duration of the field that follows the L-SIG and that is indicated in the length field in the L-SIG is a multiple of 3, that the PPDU is an EHT PPDU or a PPDU of a later version, and then identify, based on a physical layer version indication in the U-SIG, a specific version of the PPDU.

FIG. 10 is a schematic diagram of an aggregated PPDU transmission scenario. In an aggregated PPDU structure, if hybrid transmission is performed on an HE NDP and an EHT NDP that uses the structure of the NDP shown in FIG. 9, symbols of the EHT NDP and the HE NDP can be aligned, so that out-of-band interference generated between different frequency bands can be avoided.

As shown in FIG. 9, the first type of NDP in this application does not include the EHT-SIG. The U-SIG may not indicate the number of EHT-SIG symbols or an MCS, and does not need to indicate a coding-related indication, for example, an LDPC extra symbol segment indication. A packet extension indication may use a fixed value, and therefore does not need to be indicated. In this way, the U-SIG may not include the subfield indicating the number of EHT-SIG symbols, an MCS subfield, a low density parity check extra symbol segment subfield, or a packet extension disambiguity subfield. Bits that are used to carry these fields in a U-SIG of a PPDU including a data field may be used to carry other information in the U-SIG of the NDP; or bits that are used to carry these fields may be used to carry other fields. For example, the bits that are used to carry these fields may be used to carry a subfield indicating a number of EHT-LTF symbols, so that the U-SIG of the NDP can include more information.

It should be understood that, in some optional embodiments, based on the structure of the NDP shown in FIG. 9, the U-SIG may alternatively include the subfield indicating the number of EHT-SIG symbols. The subfield indicating the number of EHT-SIG symbols indicates that the number of EHT-SIG symbols is a specified value, to indicate that the PPDU is the NDP.

Optionally, the U-SIG further includes at least one of a number of spatial streams (NSS) subfield and the subfield indicating the number of EHT-LTF symbols. The NSS subfield and/or the subfield indicating the number of EHT-LTF symbols indicate/indicates an NSS and the number of EHT-LTF symbols. The subfield indicating the number of EHT-LTF symbols may be, for example, a number of EHT-LTF symbols, midamble and doppler subfield; or may be a number of EHT-LTF symbols subfield that individually indicates the number of EHT-LTF symbols.

There is a correspondence between an NSTS and an NSS. When space-time block coding (STBC) is used, the NSTS is twice the NSS, and is expressed as NSTS=2*NSS. When STBC is not used, the NSTS is the same as the NSS, and is expressed as NSTS=NSS. In this way, the NSS subfield indicating the NSS may also indicate the NSTS. The NSS subfield may be replaced with an NSTS subfield.

There is a correspondence between a number of EHT-LTF symbols and an NSTS. For example, when the NSTS is 1, the corresponding number of EHT-LTF symbols is 1; when the NSTS is 2, the corresponding number of EHT-LTF symbols is 2; when the NSTS is 3 or 4, the corresponding number of EHT-LTF symbols is 4; when the NSTS is 5 or 6, the corresponding number of EHT-LTF symbols is 6; when the NSTS is 7 or 8, the corresponding number of EHT-LTF symbols is 8; when the NSTS is any one of 9 to 12, the corresponding number of EHT-LTF symbols is 12; or when the NSTS is any one of 13 to 16, the corresponding number of EHT-LTF symbols is 16.

Specifically, in an embodiment, the U-SIG includes an NSTS subfield and a subfield indicating a number of EHT-LTF symbols. The NSTS subfield indicates an NSTS, and the subfield indicating the number of EHT-LTF symbols indicates the number of EHT-LTF symbols. Alternatively, the U-SIG includes an NSS subfield and a subfield indicating a number of EHT-LTF symbols, where the NSS subfield indicates an NSS, and indicates an NSTS based on the foregoing correspondence between an NSTS and an NSS. The subfield indicating the number of EHT-LTF symbols indicates the number of EHT-LTF symbols.

In another embodiment, the U-SIG includes an NSTS subfield, but does not include an NSS subfield or a subfield indicating a number of EHT-LTF symbols. The NSTS subfield indicates an NSTS, and can indirectly indicate an NSS and the number of EHT-LTF symbols based on the foregoing two correspondences. Alternatively, the U-SIG includes an NSS subfield, but does not include an NSTS subfield or a subfield indicating a number of EHT-LTF symbols. The NSS subfield indicates an NSS, and can indirectly indicate an NSTS and the number of EHT-LTF symbols based on the foregoing two correspondences.

In still another embodiment, the U-SIG includes a subfield indicating a number of EHT-LTF symbols, but does not include an NSTS subfield or an NSS subfield. The subfield indicating the number of EHT-LTF symbols indicates the number of EHT-LTF symbols, and indicates at least one of an NSS and an NSTS based on the foregoing correspondences.

In an optional embodiment, content included in the U-SIG of the first type of NDP in embodiments of this application is shown in Table 3. Specifically, the U-SIG includes a physical layer version identifier indication subfield, an uplink/a downlink (UL/DL) indication subfield, a basic service set color (BSS color) subfield, a transmit opportunity (TXOP) subfield, a bandwidth indication subfield, a PPDU format subfield, an NDP indication subfield, a spatial reuse indication subfield, a guard interval (Guard, GI Interval) and EHT-LTF size indication subfield, a number of EHT-LTF symbols, midamble periodicity and doppler subfield, a number of spatial streams (NSS) subfield, a CRC, and a tail bit. The U-SIG further includes five bits as reserved bits, used to carry other information that needs to be carried. It should be understood that, based on the correspondence between an NSTS and an NSS, the NSS subfield in Table 3 may be replaced with an NSTS subfield.

TABLE 3

| Bit | Field |
| --- | --- |
| B0-B2 (U-SIG-1) | Physical layer version identifier (version identifier) |
| B3 | Uplink/downlink (UL/DL) |
| B4-B9 | Basic service set color (BSS color) |
| B10-B16 | Transmit opportunity (TXOP) |
| B17-B22 | Bandwidth (bandwidth) |
| B23-B24 | PPDU format (PPDU format) |
| B25 | NDP |
| B0-B1 (U-SIG-2) | Spatial reuse (spatial reuse) |
| B2-B3 | Guard interval (GI) and EHT-LTF size (EHT-LTF size) |
| B4-B6 | Number of EHT-LTF symbols, midamble periodicity and doppler (number of EHT-LTF symbols, midamble periodicity and doppler) |
| B7-B10 | Number of spatial streams (NSS) |
| B11-B15 | Reserved (reserved) |
| B16-B19 | Cyclic redundancy code (CRC) |
| B20-B25 | Tail bit (tail) |

The NDP indication subfield indicates that the PPDU is the NDP. For content indicated by other subfields in the U-SIG, refer to related descriptions of corresponding subfields in Table 1 and Table 2. Details are not described herein again.

It should be understood that a sequence of the subfields in Table 3 and bits occupied by the subfields are not limited in this embodiment of this application. In another embodiment, adjustment may be performed based on an actual situation.

In some other possible implementations, the NDP transmitted in the PPDU transmission method in this embodiment of this application uses a structure of the second type of NDP provided in this embodiment of this application.

The second type of NDP provided in this embodiment of this application includes the EHT-SIG. The number of EHT-SIG symbols is 1, and the EHT-SIG is modulated by using the BPSKI and the code rate of 1/2. In this way, in comparison with the EHT-SIG of the PPDU including the data part shown in Table 2, the structure of the second type of NDP provided in this embodiment of this application can reduce the number of EHT-SIG symbols, so that overheads required for transmitting the NDP can be reduced.

Optionally, FIG. 11 is a schematic diagram of a structure of an NDP. The second type of NDP provided in this embodiment of this application may further include an L-STF, an L-LTF, an L-SIG, an RL-SIG, a U-SIG, an EHT-STF, an EHT-LTF, and a PE field. The PE field is used to help the Bfee obtain longer processing time. Alternatively, the NDP may not include the PE field. For example, when a processing capability of the Bfee is strong, the NDP may not include the PE field.

For descriptions of the L-STF, the L-LTF, the L-SIG, the RL-SIG, the EHT-STF, and the EHT-LTF, and descriptions of identifying the PPDU by the Bfee, refer to the related descriptions of the implementation of the structure of the first type of NDP. Details are not described herein again.

Based on the structure of the second type of NDP provided in this embodiment of this application, this embodiment of this application provides some indication manners for indicating that the PPDU is the NDP, and a related technology used by the Bfee to learn, based on the indication, that the PPDU is the NDP.

In one indication manner for indicating that the PPDU is the NDP, the U-SIG of the NDP includes a subfield indicating a number of EHT-SIG symbols, and the subfield indicating the number of EHT-SIG symbols indicates that the number of EHT-SIG symbols is any value greater than or equal to 1. For example, the subfield indicating the number of EHT-SIG symbols may be a subfield indicating a number of EHT-SIG symbols or MU-MIMO users, or may be a number of EHT-SIG symbols subfield.

Optionally, the Bfee may obtain, based on length indication information in the L-SIG, a sum of lengths of all fields following the L-SIG, and then obtain lengths of the RL-SIG, the EHT-SIG, the EHT-LTF, and the PE field based on the number of EHT-SIG symbols, a number of EHT-LTF symbols, a length of a guard interval, a size of the EHT-LTF, and a packet extension related parameter that are indicated in the U-SIG and the EHT-SIG. Lengths of the RL-SIG, the U-SIG, and the EHT-STF are fixed. In this case, the Bfee may subtract lengths of the RL-SIG, the U-SIG, the EHT-SIG, the EHT-STF, the EHT-LTF, and the PE field from a sum of the lengths of all the fields following the L-SIG that are obtained based on the length indication information in the L-SIG, to obtain a length of the data field, and calculate a number of symbols of the data field. If the Bfee calculates that the length of the data field is less than or equal to 0, the Bfee identifies that the PPDU is the NDP.

It may be understood that, the subfield indicating the number of EHT-SIG symbols indicates that the number of EHT-SIG symbols is 1, and the Bfee can calculate that the length of the data field in the PPDU is 0, to determine that the PPDU is the NDP. The subfield indicating the number of EHT-SIG symbols indicates that the number of EHT-SIG symbols is greater than 1, and the Bfee can calculate that the length of the data field in the PPDU is less than 0, sto determine that the PPDU is the NDP.

Further, the subfield indicating the number of EHT-SIG symbols indicates that the number of EHT-SIG symbols is 1, the U-SIG further includes an MCS subfield, and the MCS subfield indicates that the EHT-SIG is modulated by using the BPSK and the code rate of 1/2. As shown in Table 2, in the PPDU including the data field, a number of information bits of the EHT-SIG is 54. When the EHT-SIG is modulated by using the BPSK and the code rate of 1/2, a number of EHT-SIG symbols obtained through coding is greater than 1.

In this way, based on that the subfield indicating the number of EHT-SIG symbols indicates that the number of EHT-SIG symbols is 1 and the MCS subfield indicates that the EHT-SIG is modulated by using the BPSK and the code rate of 1/2, the Bfee may determine that the PPDU is the NDP. The Bfee can identify, without calculating the number of symbols of the data field, that the PPDU is the NDP. In this way, the Bfee can prepare in advance the procedure of calculating the channel state information, to obtain longer processing time, and does not need to determine, after calculating that the length of the data part of the PPDU is 0, that the PPDU is the NDP. The NDP helps improve efficiency of reading the NDP by the Bfee.

In an optional embodiment, the U-SIG further includes an NDP indication subfield and/or a PPDU format subfield. The NDP indication subfield or the PPDU format subfield in the U-SIG indicates that the PPDU is in an uncompressed mode. When the PPDU is in the uncompressed mode, the subfield indicating the number of EHT-SIG symbols or MU-MIMO users in the U-SIG indicates the number of EHT-SIG symbols. In this way, the subfield indicating the number of EHT-SIG symbols or MU-MIMO users can indicate that the number of EHT-SIG symbols is 1.

It should be understood that, in another optional embodiment, when the PPDU is in a compressed mode, the EHT-SIG symbol number subfield in the U-SIG indicates that the number of EHT-SIG symbols is 1.

In another optional embodiment, the EHT-SIG of the NDP includes a common field, but does not include a user-specific field. In this way, the number of EHT-SIG symbols can be reduced by omitting a user field.

Specifically, as shown in Table 4, the EHT-SIG of the NDP includes a number of EHT-LTF symbols, midamble periodicity and doppler subfield, a preamble puncture indication subfield, a number of space-time streams (NSTS) subfield, a cyclic redundancy code (CRC), and a tail bit (tail). The number of EHT-LTF symbols, midamble periodicity and doppler subfield may be understood as a subfield indicating a number of EHT-LTF symbols. It should be understood that, based on the correspondence between an NSTS and an NSS, the NSTS subfield in Table 4 may be replaced with an NSS subfield.

TABLE 4

| Bit | Subfield |
| --- | --- |
| B0-B3 | Number of EHT-LTF symbols, midamble periodicity and doppler |
| B4-B11 | Preamble puncture |
| B12-B15 | Number of space-time streams (NSTS) |
| B16-B19 | CRC |
| B20-B25 | Tail bit (tail) |

The number of EHT-LTF symbols, midamble periodicity and doppler subfield indicates the number of EHT-LTF symbols, a midamble periodicity, and doppler. The preamble puncture indication subfield indicates a preamble puncture mode. The NSTS subfield indicates a number of space-time streams or a number of spatial streams of a STA. Optionally, if space-time block coding is not considered, the NSTS subfield indicates an NSS, or the NSTS subfield in Table 4 may be replaced with the NSS subfield. The CRC is used to verify information. The tail bit is used to end coding.

Optionally, the EHT-SIG may include only one of the NSTS subfield, the number of spatial streams (NSS) subfield used to indicate the number of spatial streams, and the number of EHT-LTF symbols, midamble periodicity and doppler subfield. In this way, some fields in the EHT-SIG may be omitted, and bits originally used to carry the omitted fields may be used to carry other information.

In a possible case, the EHT-SIG includes the number of EHT-LTF symbols, midamble periodicity and doppler subfield, but does not include the NSTS subfield or the NSS subfield. In this way, bits (B12 to B15) originally used to carry the NSTS subfield or the NSS subfield may be used to carry other information.

Specifically, a part that is of the number of EHT-LTF symbols, midamble periodicity and doppler subfield and that originally indicates the number of EHT-LTF symbols may be used to indicate the number of EHT-LTF symbols, or used to indicate the NSTS in an escape mode. Based on the correspondence between a number of EHT-LTF symbols and an NSTS and the correspondence between an NSS and an NSTS in the foregoing related descriptions of the first type of NDP, the number of EHT-LTF symbols, midamble periodicity and doppler subfield may indicate one of the number of EHT-LTF symbols, the NSTS, or the NSS, to indicate the number of EHT-LTF symbols and the NSTS; or to indicate the number of EHT-LTF symbols and the NSS.

In another possible case, the EHT-SIG includes the NSTS subfield, but does not include the NSS subfield or the number of EHT-LTF symbols, midamble periodicity and doppler subfield. Specifically, the NSTS subfield indicates the NSTS, and indirectly indicates the NSS and the number of EHT-LTF symbols based on the correspondence between a number of EHT-LTF symbols and an NSTS and the correspondence between an NSS and an NSTS in the foregoing related descriptions of the first type of NDP. In this way, bits (B0 to B3) that are originally used to carry the number of EHT-LTF symbols, midamble periodicity and doppler subfield may be used to carry other information.

In still another possible case, the EHT-SIG includes the NSS subfield, but does not include the NSTS subfield or the number of EHT-LTF symbols, midamble periodicity and doppler subfield. Specifically, the NSS subfield indicates the NSS, and indirectly indicates the NSTS and the number of EHT-LTF symbols based on the correspondence between a number of EHT-LTF symbols and an NSTS and the correspondence between an NSS and an NSTS in the foregoing related descriptions of the first type of NDP. In this way, bits (B0 to B3) that are originally used to carry the number of EHT-LTF symbols, midamble periodicity and doppler subfield may be used to carry other information.

It should be understood that, in the second type of NDP provided in embodiments of this application, the foregoing two optional embodiments may be implemented separately, or may be implemented in combination.

It can be learned that in the second type of NDP provided in embodiments of this application, there is only one EHT-SIG symbol, so that NDP overheads are reduced while sufficient information is carried.

In some still other possible implementations, the NDP transmitted in the PPDU transmission method in this embodiment of this application uses a structure of the third type of NDP provided in this embodiment of this application.

The third type of NDP provided in this embodiment of this application includes the EHT-SIG. The EHT-SIG includes a user field. The user field includes the AID subfield indicating the AID. Specifically, the EHT-SIG of the NDP includes a common field and a user-specific field. The common field indicates some common information, for example, preamble indication information, indicating a puncturing status of the EHT NDP. The user-specific field includes the user field.

In a possible implementation, the AID is used to indicate the information related to the user of the NDP. The user of the NDP may be one or more STAs, or may be an AP. In this way, the Bfee can determine, based on the AID in the EHT-SIG of the NDP, the information related to the user of the NDP. In this way, the Bfee can accurately determine whether the Bfee is a user that needs to perform channel sounding and feed back a beamforming report.

The following provides some embodiments in which the AID subfield indicates the information related to the user of the NDP.

In some embodiments, if the user of the NDP is one station, the AID indicated by the AID subfield is an AID of the station. It may be understood that, in this embodiment, only one station receives the NDP, then performs channel estimation, and feeds back a beamforming report.

In this way, the station corresponding to the AID can determine, based on the AID in the NDP, that the station is a station that needs to perform channel sounding and feed back a beamforming report based on a channel sounding result. In this way, even if the station fails to read a user field including the AID of the station because the station does not correctly read an NDPA frame, the station can determine, based on the NDP, that the station is a station that needs to perform channel sounding and feed back a beamforming report based on a channel sounding result, so that a success rate of obtaining the beamforming report by the Bfer can be improved. In addition, after receiving the NDP, if a device that does not match the AID indicated by the AID subfield reads that the AID indicated by the AID subfield is inconsistent with an AID of the device, the device does not continue to receive the NDP, so that power consumption of the device that does not match the AID indicated by the AID subfield can be reduced.

In some other embodiments, if the user of the NDP is a plurality of stations, the AID indicated by the user field is 0, indicating that the NDP is sent through broadcast. In this embodiment, an EHT-SIG of an NDPA frame sent before the NDP includes a plurality of station fields, and an AID subfield in the plurality of station fields indicates an AID of a station that needs to perform channel sounding and feed back a beamforming report. In this way, the station receives the NDP, and determines, based on that the AID subfield in the NDP is 0, that the user of the NDP is the plurality of stations.

In this way, all stations that receive the NDP, or stations corresponding to AIDs indicated by user fields in NDPA frames continue to receive the NDP, to obtain channel state information based on the NDP and feed back beamforming reports.

In some still other embodiments, if the user of the NDP is an access point, the AID indicated by the AID subfield is a specified value. The specified value may be notified by the AP through broadcast, or may be a fixed value, for example, 2045, preset in a standard. It should be understood that the specified value may alternatively be another value.

Optionally, for a structure of the third type of NDP provided in this embodiment of this application, refer to FIG. 11. The NDP further includes an L-STF, an L-LTF, an L-SIG, an RL-SIG, a U-SIG, an EHT-STF, an EHT-LTF, and a PE field. For functions of these subfields, refer to related descriptions of the first type of NDP provided in the foregoing embodiments of this application. Details are not described herein again.

It can be learned that, the structure of the NDP is similar to the format of the EHT PPDU including the data field shown in FIG. 5. In this way, the Bfee can receive the NDP by using a receiving policy similar to that of the EHT PPDU including the data field, so that the Bfee receives the NDP.

For a manner in which the Bfee identifies a version of the PPDU, refer to related descriptions of identifying the version of the PPDU by the Bfee in the foregoing embodiment that corresponds to the first type of NDP and that is provided in embodiments of this application. Details are not described herein again.

For a manner in which the Bfee identifies that the PPDU is the NDP, the manner in which the Bfee calculates the length of the data field in the foregoing embodiment that corresponds to the second type of NDP and that is provided in embodiments of this application may be used to calculate that the length of the data field is 0, so that the Bfee identifies that the PPDU is the NDP.

In the third type of NDP provided in embodiments of this application, some simpler indication manners used to indicate that the PPDU is the NDP may alternatively be used. In this way, the Bfee can determine, earlier in a simpler manner, that the PPDU is the NDP, prepare in advance a procedure of calculating the channel state information, and obtain longer processing time.

In one indication manner for indicating that the PPDU is the NDP, the U-SIG includes a format subfield and/or a compressed subfield, and the format subfield or the compressed subfield in the U-SIG indicates that the PPDU is the NDP. In this way, after identifying the PPDU, the Bfee can identify, based on the format subfield or the compressed subfield, that the PPDU is the NDP. In this way, before it is calculated that the number of symbols of the data field of the PPDU is 0, the PPDU may be identified as the NDP, and the PPDU is read based on a format of the NDP, so that the Bfee can prepare in advance the procedure of calculating the channel state information, obtain longer processing time, and improve NDP reading efficiency.

The indication manner for indicating that the PPDU is the NDP may be implemented in combination with any embodiment in which the AID subfield indicates the information related to the user of the NDP, or may be implemented individually.

Specifically, in an embodiment, the U-SIG includes the format subfield and the compressed subfield, and the format subfield or the compressed subfield indicates that the PPDU is the NDP. In another embodiment, the U-SIG includes the format subfield, and the format subfield indicates that the PPDU is the NDP. In still another embodiment, the U-SIG includes the compressed subfield, and the compressed subfield indicates that the PPDU is the NDP.

Certainly, in another embodiment, the format subfield or the compressed subfield may alternatively indicate that the PPDU is a PPDU in a compressed mode. In this embodiment, the PPDU is an NDP in the compressed mode. This can reduce overheads of the EHT-SIG of the NDP.

In another indication manner for indicating that the PPDU is the NDP, the AID in the EHT-SIG indicates that the PPDU is the NDP. Specifically, the AID in the EHT-SIG is a specified value indicating that the PPDU is the NDP, to indicate that the PPDU is the NDP. The value indicating that the PPDU is the NDP may be, for example, 2044. Certainly, in another embodiment, the value indicating that the PPDU is the NDP may alternatively be another value.

In an optional embodiment, a number of EHT-LTF symbols is greater than a number of space-time streams. In this way, in an aggregated PPDU transmission scenario, when a plurality of NDPs whose structures are the same as the structure of the third type of NDP are transmitted on different channels, even if spatial streams on the channels are different, quantities of EHT-LTF symbols of the NDPs transmitted on the channels may be the same. This helps align symbols of fields of the NDPs, to avoid out-of-band interference between different frequency bands.

In the foregoing embodiments provided in this application, the method provided in embodiments of this application is separately described from perspectives of the access point and the station. To implement the functions in the foregoing method provided in embodiments of this application, the access point and the station may include a hardware structure and a software module, and implement the foregoing functions in a form of the hardware structure, the software module, or a combination of the hardware structure and the software module. One of the foregoing functions may be performed in a form of a hardware structure, a software module, or a combination of the hardware structure and the software module.

Figure 12:
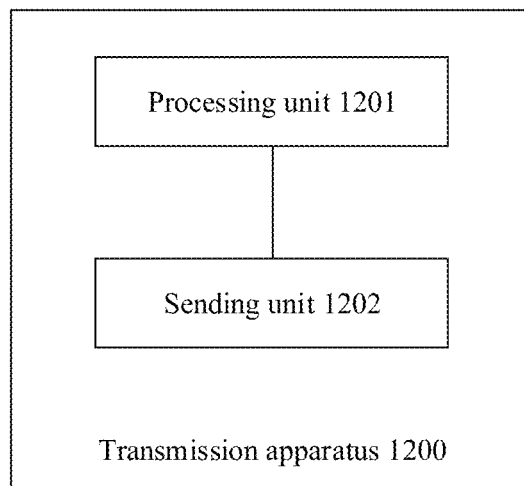
FIG. 12 is a schematic diagram of modules of a transmission apparatus according to an embodiment of this application.

FIG. 12 is a schematic diagram of modules of a transmission apparatus 1200 according to an embodiment of this application. The transmission apparatus 1200 includes a processing unit 1201 and a sending unit 1202.

The processing unit 1201 is configured to generate a PPDU, where the PPDU includes a universal signal field U-SIG, and the U-SIG includes a subfield indicating that the PPDU is a null data packet NDP.

The sending unit 1202 is configured to send the PPDU.

In this way, a Bfee that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve efficiency of receiving the NDP by the Bfee.

The transmission apparatus 1200 may be understood as a Bfer. The transmission apparatus 1200 may be, for example, an access point or a station. Alternatively, the transmission apparatus is deployed at an access point or a station. The processing unit 1201 of the transmission apparatus 1200 may be a processor, and the sending unit 1202 of the transmission apparatus 1200 may be a transceiver.

In some embodiments, the PPDU further includes an extremely high throughput-short training field EHT-STF adjacent to and following the U-SIG.

In some embodiments, the subfield indicating that the PPDU is the NDP is an NDP indication subfield, a PPDU format subfield, or a subfield indicating a number of EHT-SIG symbols, in the U-SIG.

In some embodiments, the U-SIG further includes a number of spatial streams subfield and/or a subfield indicating a number of extremely high throughput-long training field (EHT-LTF) symbols, and the number of spatial streams subfield and/or the subfield indicating the number of EHT-LTF symbols indicate/indicates a number of spatial streams and the number of EHT-LTF symbols.

Figure 13:
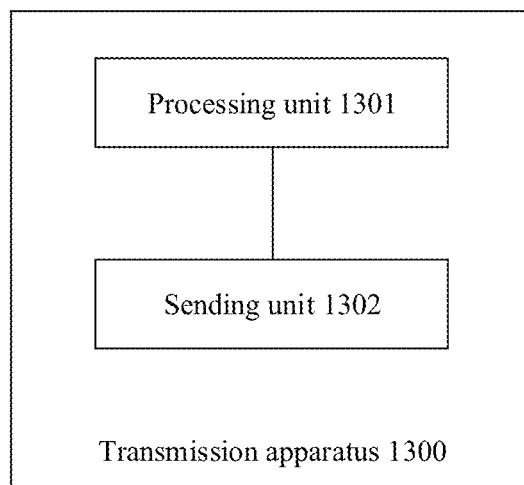
FIG. 13 is a schematic diagram of modules of a transmission apparatus according to an embodiment of this application.

FIG. 13 is a schematic diagram of modules of a transmission apparatus according to an embodiment of this application. The transmission apparatus 1300 includes a processing unit 1301 and a sending unit 1302.

The processing unit 1301 is configured to generate a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2.

The sending unit 1302 is configured to send the PPDU.

In this way, the number of EHT-SIG symbols can be reduced, so that overheads required for transmitting the NDP can be reduced.

The transmission apparatus 1300 may be understood as a Bfer. The transmission apparatus 1300 may be, for example, an access point or a station. Alternatively, the transmission apparatus is deployed at an access point or a station. The processing unit 1301 of the transmission apparatus 1300 may be a processor, and the sending unit 1302 of the transmission apparatus 1300 may be a transceiver.

In some embodiments, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1.

In some embodiments, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2.

In some embodiments, an NDP indication subfield or a PPDU format subfield in the U-SIG indicates that the PPDU is in an uncompressed mode.

In some embodiments, a number of space-time streams subfield and/or a subfield indicating a number of EHT-LTF symbols in the EHT-SIG indicate/indicates a number of space-time streams and the number of EHT-LTF symbols.

Figure 14:
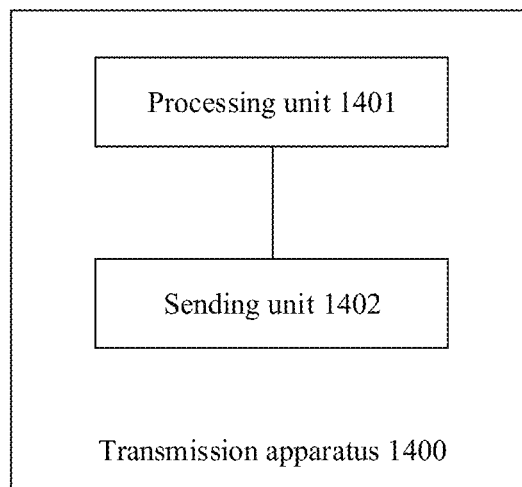
FIG. 14 is a schematic diagram of modules of a transmission apparatus according to an embodiment of this application.

FIG. 14 is a schematic diagram of modules of a transmission apparatus according to an embodiment of this application. The transmission apparatus 1400 includes a processing unit 1401 and a sending unit 1402.

The processing unit 1401 is configured to generate a PPDU, where the PPDU is an NDP, the PPDU includes an EHT-SIG, the EHT-SIG includes an AID subfield indicating an association identifier AID, and the AID is used to indicate information related to a user of the NDP.

The sending unit 1402 is configured to send the PPDU.

In this way, a Bfee can determine, based on the AID in the EHT-SIG of the NDP, the information related to the user of the NDP. In this way, the Bfee can accurately determine whether the Bfee is a user that needs to perform channel sounding and feed back a beamforming report.

The transmission apparatus 1400 may be understood as a Bfer. The transmission apparatus 1400 may be, for example, an access point or a station. Alternatively, the transmission apparatus is deployed at an access point or a station. The processing unit 1401 of the transmission apparatus 1400 may be a processor, and the sending unit 1402 of the transmission apparatus 1400 may be a transceiver.

In some embodiments, if the user of the NDP is one station, the AID indicated by the AID subfield is an AID of the station.

In some embodiments, if the user of the NDP is a plurality of stations, the AID indicated by the user field is 0, indicating that the NDP is sent through broadcast.

In some embodiments, if the user of the NDP is an access point, the AID indicated by the AID subfield is a specified value.

In some embodiments, the PPDU further includes a U-SIG, the U-SIG includes a format subfield and/or a compressed subfield, and the format subfield or the compressed subfield indicates that the PPDU is the NDP.

In some embodiments, the PPDU further includes a U-SIG and an EHT-LTF, the U-SIG includes a number of space-time streams subfield that indicates a number of space-time streams, and a number of EHT-LTF symbols is greater than the number of space-time streams.

Figure 15:
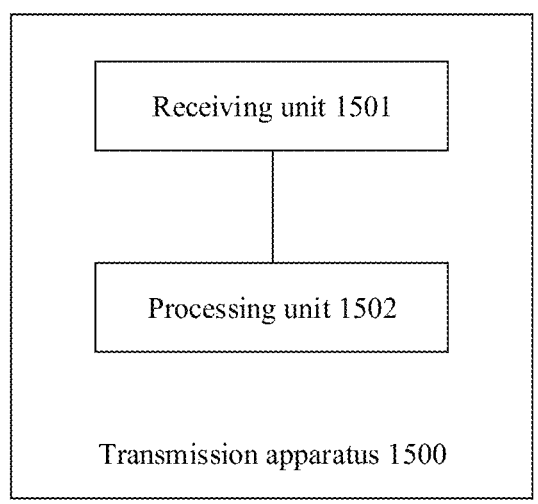
FIG. 15 is a schematic diagram of modules of a transmission apparatus according to an embodiment of this application.

FIG. 15 is a schematic diagram of modules of a transmission apparatus according to an embodiment of this application. The transmission apparatus 1500 includes a receiving unit 1501 and a processing unit 1502.

The receiving unit 1501 is configured to receive a PPDU, where the PPDU is an NDP, the PPDU includes a universal signal field U-SIG, and the U-SIG includes a subfield indicating that the PPDU is the null data packet NDP.

The processing unit 1502 is configured to perform channel estimation by using the NDP.

A Bfee that receives the NDP can determine, based on the subfield, in the U-SIG, indicating that the PPDU is the NDP, that the PPDU is the NDP, so that the Bfee can prepare in advance a procedure of calculating channel state information, to obtain longer processing time, and does not need to determine, after calculating that a length of a data part of the PPDU is 0, that the PPDU is the NDP. The NDP helps improve efficiency of receiving the NDP by the Bfee.

The transmission apparatus 1500 may be understood as the Bfee. The transmission apparatus 1500 may be, for example, a station or an access point. Alternatively, the transmission apparatus 1500 is deployed at a station or an access point. The processing unit 1502 of the transmission apparatus 1500 may be a processor, and the receiving unit 1501 of the transmission apparatus 1500 may be a transceiver.

In some embodiments, the PPDU further includes an extremely high throughput-short training field EHT-STF adjacent to and following the U-SIG.

In some embodiments, the subfield indicating that the PPDU is the NDP is an NDP indication subfield, a PPDU format subfield, or a subfield indicating a number of EHT-SIG symbols, in the U-SIG.

In some embodiments, the U-SIG further includes a number of spatial streams subfield and/or a subfield indicating a number of extremely high throughput-long training field (EHT-LTF) symbols, and the number of spatial streams subfield and/or the subfield indicating the number of EHT-LTF symbols indicate/indicates a number of spatial streams and the number of EHT-LTF symbols.

Figure 16:
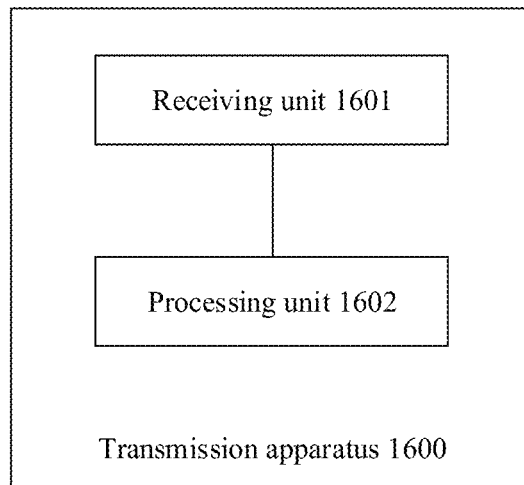
FIG. 16 is a schematic diagram of modules of a transmission apparatus according to an embodiment of this application.

FIG. 16 is a schematic diagram of modules of a transmission apparatus according to an embodiment of this application. The transmission apparatus 1600 includes a receiving unit 1601 and a processing unit 1602.

The receiving unit 1601 is configured to receive a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2.

The processing unit 1602 is configured to perform channel estimation by using the NDP.

In this way, the number of EHT-SIG symbols can be reduced, so that overheads required for transmitting the NDP can be reduced.

The transmission apparatus 1600 may be understood as a Bfee. The transmission apparatus 1600 may be, for example, a station or an access point. Alternatively, the transmission apparatus 1600 is deployed at a station or an access point. The processing unit 1602 of the transmission apparatus 1600 may be a processor, and the receiving unit 1601 of the transmission apparatus 1600 may be a transceiver.

In some embodiments, the PPDU further includes a universal signal field U-SIG, the U-SIG includes a subfield indicating the number of EHT-SIG symbols, and the subfield indicating the number of EHT-SIG symbols indicates that the number of EHT-SIG symbols is any value greater than or equal to 1.

In some embodiments, an NDP indication subfield or a PPDU format subfield in the U-SIG indicates that the PPDU is in an uncompressed mode.

In some embodiments, the subfield indicating the number of EHT-SIG symbols indicates that the number of EHT-SIG symbols is 1, the U-SIG further includes a modulation and coding scheme MCS subfield, and the MCS subfield indicates that the EHT-SIG is modulated by using the BPSK and the code rate of 1/2.

In some embodiments, a number of space-time streams subfield and/or a subfield indicating a number of EHT-LTF symbols in the EHT-SIG indicate/indicates a number of space-time streams and the number of EHT-LTF symbols.

Figure 17:
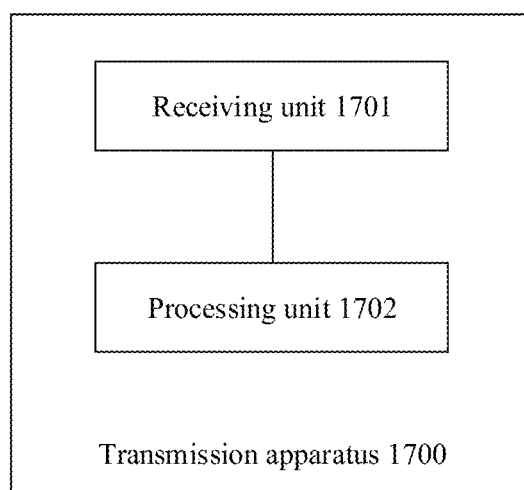
FIG. 17 is a schematic diagram of modules of a transmission apparatus according to an embodiment of this application.

FIG. 17 is a schematic diagram of modules of a PPDU transmission apparatus according to an embodiment of this application. The transmission apparatus 1700 includes a receiving unit 1701 and a processing unit 1702.

The receiving unit 1701 is configured to receive a PPDU, where the PPDU is an NDP, the PPDU includes an extremely high throughput-signal field EHT-SIG, a number of EHT-SIG symbols is 1, and the EHT-SIG is modulated by using BPSK and a code rate of 1/2.

The processing unit 1702 is configured to perform channel estimation by using the NDP.

In this way, a Bfee can determine, based on an AID in the EHT-SIG of the NDP, information related to a user of the NDP. In this way, the Bfee can accurately determine whether the Bfee is a user that needs to perform channel sounding and feed back a beamforming report.

The transmission apparatus 1600 may be understood as the Bfee. The transmission apparatus 1700 may be, for example, a station or an access point. Alternatively, the transmission apparatus 1700 is deployed at a station or an access point. The processing unit 1702 of the transmission apparatus 1700 may be a processor, and the receiving unit 1701 of the transmission apparatus 1700 may be a transceiver.

In some embodiments, if the user of the NDP is one station, the AID indicated by an AID subfield is an AID of the station.

In some embodiments, if the user of the NDP is a plurality of stations, the AID indicated by the user field is 0, indicating that the NDP is sent through broadcast.

In some embodiments, if the user of the NDP is an access point, the AID indicated by the AID subfield is a specified value.

In some embodiments, the PPDU further includes a U-SIG, the U-SIG includes a format subfield and/or a compressed subfield, and the format subfield or the compressed subfield indicates that the PPDU is the NDP.

In some embodiments, the PPDU further includes a U-SIG and an EHT-LTF, the U-SIG includes a number of space-time streams subfield that indicates a number of space-time streams, and a number of EHT-LTF symbols is greater than the number of space-time streams.

For related content of the foregoing embodiments of the transmission apparatuses, refer to related content of the foregoing method embodiments. Details are not described herein again.

This application further provides a computer-readable storage medium. The computer-readable storage medium stores a computer program. When the computer-readable storage medium is executed by a computer, a function of any one of the foregoing method embodiments is implemented.

This application further provides a computer program product. When the computer program product is executed by a computer, a function of any one of the foregoing method embodiments is implemented.

It should be further understood that "first", "second", "third", "fourth", and various numbers in this specification are merely used for differentiation for ease of description, and are not construed as a limitation on the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

Persons skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, and deleted based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A physical layer protocol data unit (PPDU) transmission method, comprising:
  receiving a PPDU, wherein the PPDU comprises an extremely high throughput-signal (EHT-SIG) field and an universal signal (U-SIG) field, wherein the EHT-SIG field comprises a subfield indicating a number of space streams and a subfield indicating a number of extremely high throughput-long training field (EHT-LTF) symbols, wherein the U-SIG field comprises a subfield indicating that a symbol number of the EHT-SIG field is 1, and wherein the U-SIG field further comprises a modulation and coding scheme (MCS) subfield, and the MCS subfield indicates that the EHT-SIG field is modulated using binary phase shift keying (BPSK) and a code rate of 1/2;
  identifying that the PPDU is a null data packet (NDP) based on both the symbol number of the EHT-SIG field being 1 and the EHT-SIG field being modulated using BPSK and the code rate of 1/2; and
  performing channel estimation using the NDP.

2. The method according to claim 1, wherein the method further comprises:
  identifying that the PPDU is in an uncompressed mode according to an indication of an NDP indication subfield or a PPDU format subfield in the U-SIG field.

3. A physical layer protocol data unit (PPDU) transmission apparatus, comprising:
  a processor; and
  a transceiver, wherein in response to the processor executing a computer program or instructions in a memory:
    the transceiver is configured to receive a PPDU, wherein the PPDU comprises an extremely high throughput-signal (EHT-SIG) field and an universal signal (U-SIG) field, wherein the EHT-SIG field comprises a subfield indicating a number of space streams and a subfield indicating a number of extremely high throughput-long training field (EHT-LTF) symbols, wherein the U-SIG field comprises a subfield indicating that a symbol number of the EHT-SIG field is 1, and wherein the U-SIG field further comprises a modulation and coding scheme (MCS) subfield, and the MCS subfield indicates that the EHT-SIG field is modulated using binary phase shift keying (BPSK) and a code rate of 1/2; and
    the processor is configured to:
      identify that the PPDU is a null data packet (NDP) based on both the symbol number of the EHT-SIG field being 1 and the EHT-SIG field being modulated using BPSK and the code rate of 1/2; and
      perform channel estimation using the NDP.

4. The transmission apparatus according to claim 3, wherein the processor is configured to identify that the PPDU is in an uncompressed mode according to an indication of an NDP indication subfield or a PPDU format subfield in the U-SIG field.

5. A non-transitory computer-readable storage medium storing computer instructions that, when executed by a processor, cause a computing device to:
  receive a physical layer protocol data unit (PPDU), wherein the PPDU comprises an extremely high throughput-signal (EHT-SIG) field and an universal signal (U-SIG) field, wherein the EHT-SIG field comprises a subfield indicating a number of space streams and a subfield indicating a number of extremely high throughput-long training field (EHT-LTF) symbols, wherein the U-SIG field comprises a subfield indicating that a symbol number of the EHT-SIG field is 1, and wherein the U-SIG field further comprises a modulation and coding scheme (MCS) subfield, and the MCS subfield indicates that the EHT-SIG field is modulated using binary phase shift keying (BPSK) and a code rate of 1/2;
  identify that the PPDU is a null data packet (NDP) based on both the symbol number of the EHT-SIG field being 1 and the EHT-SIG field being modulated using BPSK and the code rate of 1/2; and
  perform channel estimation using the NDP.

6. The computer-readable storage medium according to claim 5, wherein the computer instructions, when executed by the processor, further cause the computing device to:
  identify that the PPDU is in an uncompressed mode according to an indication of an NDP indication subfield or a PPDU format subfield in the U-SIG field.

* * * * *